(12) United States Patent
Ueki et al.

(10) Patent No.: US 10,292,090 B2
(45) Date of Patent: May 14, 2019

(54) MOBILE STATION, MOBILE COMMUNICATION SYSTEM, AND NETWORK DEVICE

(71) Applicant: NTT DOCOMO, INC., Tokyo (JP)

(72) Inventors: Atsushi Ueki, Tokyo (JP); Shinya Takeda, Tokyo (JP); Takehiro Ida, Tokyo (JP); Itsuma Tanaka, Tokyo (JP); Wuri Andarmawanti Hapsari, Tokyo (JP); Kenichiro Aoyagi, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 46 days.

(21) Appl. No.: 15/024,476

(22) PCT Filed: Sep. 10, 2014

(86) PCT No.: PCT/JP2014/073867
§ 371 (c)(1),
(2) Date: Mar. 24, 2016

(87) PCT Pub. No.: WO2015/045859
PCT Pub. Date: Apr. 2, 2015

(65) Prior Publication Data
US 2016/0242106 A1   Aug. 18, 2016

(30) Foreign Application Priority Data

Sep. 26, 2013 (JP) .................................. 2013-200655
May 23, 2014 (JP) .................................. 2014-107465

(51) Int. Cl.
*H04W 48/16* (2009.01)
*H04W 4/90* (2018.01)
(Continued)

(52) U.S. Cl.
CPC ............. *H04W 48/16* (2013.01); *H04W 4/90* (2018.02); *H04W 48/06* (2013.01);
(Continued)

(58) Field of Classification Search
CPC ....... H04W 48/16; H04W 4/22; H04W 48/06; H04W 68/005; H04W 76/007;
(Continued)

(56) References Cited

U.S. PATENT DOCUMENTS

2011/0188455 A1   8/2011   Suzuki et al.
2012/0099560 A1   4/2012   Giaretta et al.
(Continued)

FOREIGN PATENT DOCUMENTS

CN   102119550 A   7/2011
JP   2010041630 A   2/2010
(Continued)

OTHER PUBLICATIONS

WO2011043323_MachineTranslationCopy.*
(Continued)

*Primary Examiner* — Obaidul Huq
(74) *Attorney, Agent, or Firm* — Osha Liang LLP

(57) ABSTRACT

An object is to provide a mobile station, a mobile communication system, and a network device that can realize more appropriate call origination control per service as intended by an operator. An MMTEL function unit (120) of a UE (100), based on ssac-BarringForMMTEL-Voice, upon determining that call origination of a VoLTE call is possible, transmits Bearer Request to an NAS function unit (170). The NAS function unit (170), in accordance with the Bearer Request, transmits Service Request to an RRC function unit (190). The RRC function unit (190), in accordance with the Service Request, based on ac-BarringForMO-Data or Tbarring, transmits RRC Connection Request to a mobile com-
(Continued)

munication network (200) without determining a possibility of call origination of the VoLTE call.

5 Claims, 18 Drawing Sheets

(51) Int. Cl.
    H04W 76/50      (2018.01)
    H04W 76/16      (2018.01)
    H04W 48/06      (2009.01)
    H04W 68/00      (2009.01)
    H04W 4/14       (2009.01)
(52) U.S. Cl.
    CPC ......... H04W 68/005 (2013.01); H04W 76/16 (2018.02); H04W 76/50 (2018.02); H04W 4/14 (2013.01)
(58) Field of Classification Search
    CPC ....... H04W 76/026; H04W 4/14; H04W 4/90; H04W 76/50; H04W 76/16
    USPC .................................................. 370/310, 328
    See application file for complete search history.

(56) References Cited

U.S. PATENT DOCUMENTS

| 2012/0250626 | A1  |   | 10/2012 | Iwamura et al. |           |
|--------------|-----|---|---------|----------------|-----------|
| 2013/0095796 | A1  | * | 4/2013  | Cho            | H04W 4/14 |
|              |     |   |         |                | 455/411   |
| 2015/0223144 | A1  | * | 8/2015  | Lee            | H04W 48/02 |
|              |     |   |         |                | 370/259   |
| 2015/0304937 | A1  | * | 10/2015 | Kim            | H04W 48/14 |
|              |     |   |         |                | 370/230   |

FOREIGN PATENT DOCUMENTS

| JP | WO 2011043323 | A1 | * | 4/2011 | ............ H04W 48/08 |
| JP | 201223642     | A  |   | 2/2012 |                        |
| JP | 2012119826    | A  |   | 6/2012 |                        |
| JP | 2013526181    | A  |   | 6/2013 |                        |
| JP | 2013-150088   | A  |   | 8/2013 |                        |
| WO | 2014/021266   | A1 |   | 2/2014 |                        |
| WO | 2014/024607   | A1 |   | 2/2014 |                        |

OTHER PUBLICATIONS

European Search Report issued in corresponding European Patent No. 14847692.2, dated Aug. 30, 2016 (7 pages).
NTT DOCOMO, Inc.; "Requirement and Way forward for SSAC in CONNECTED"; 3GPP TSG RAN2#83, R2-132758; Barcelona, Spain; Aug. 19-23, 2013 (8 pages).
Office Action issued in corresponding Singapore Application No. 11201602324S, dated Dec. 1, 2016 (9 pages).
Office Action issued in corresponding Japanese Application No. 2014-107465, dated May 23, 2017 (6 pages).
International Search Report issued in corresponding application No. PCT/JP2014/073867 dated Dec. 2, 2014 (4 pages).
Written Opinion of the International Searching Authority issued in corresponding application No. PCT/JP2014/073867 dated Dec. 2, 2014 (4 pages).
Intel Corporation, "EAB for RAN overload protection"; 3GPP TSG RAN WG2 Meeting #74, R2-113217; Barcelona, Spain, May 9-13, 2011 (4 pages).
NTT DOCOMO, Inc., "ETWS reception in relation with access class barring"; 3GPP TSG-RAN2#80, R2-125468; New Orleans, USA, Nov. 12-16, 2012 (4 pages).
3GPP TS 36.331 V9.10.0, "3rd Generation Partnership Project; Technical Specification Group Radio Access Network; Evolved Universal Terrestrial Radio Access (E-UTRA); Radio Resource Control (RRC); Protocol specification (Release 9)"; Mar. 2012 (255 pages).
3GPP TS 24.301 V11.2.0, "3rd Generation Partnership Project; Technical Specification Group Core Network and Terminals; Non-Access-Stratum (NAS) protocol for Evolved Packet System (EPS); Stage 3 (Release 11)"; Mar. 2012 (327 pages).
3GPP TS 24.173 V11.2.0, "3rd Generation Partnership Project; Technical Specification Group Core Network and Terminals; IMS multimedia telephony communication service and supplementary services; Stage 3 (Release 11)"; Mar. 2012 (17 pages).
Office Action issued in the counterpart Singapore Patent Application No. 11201602324S, dated Jul. 18, 2017 (9 pages).
Office Action issued in the counterpart Singapore Application No. 11201602324S, dated Jan. 23, 2018 (6 pages).
Office Action issued in the counterpart Japanese Patent Application No. 2014-107465, dated Nov. 28, 2017 (6 pages).
Office Action issue in counterpart Chinese Patent Application No. 201480052925.9, dated Aug. 28, 2018 (26 Pages).
Office Action issued in counterpart Japanese Patent Applicaton No. 2014-107465, dated May 8, 2018 (4 Pages).
Office Action issued in the counterpart Chinese Patent Application No: 201480052925.9, dated Dec. 13, 2018 (15 pages).
Samsung; "RAN2 impacts for skipping ACB for MMTEL-voice/video and SMS"; 3GPP TSG RAN WG2 #86 R2-142288; Seoul, Korea, May 19-23, 2014 (4 pages).

* cited by examiner

Prior Art

MOBILE STATION, MOBILE COMMUNICATION SYSTEM, AND NETWORK DEVICE

TECHNICAL FIELD

The present invention relates to a mobile station, a mobile communication system, and a network device that perform an operation in accordance with an access control.

BACKGROUND ART

In the LTE (Long Term Evolution) system, from the Release-8, ACB (Access Class Barring) for Data is specified as a method for controlling call origination of a data call other than an urgent call in a mobile station UE.

In the ACB for Data, the mobile station UE determines, based on ac-BarringFactor (communication success rate) included in ac-BarringForMO-Data included in SIB2, whether to control call origination of the data call other than the urgent call.

Specifically, the mobile station UE, upon determining to control call origination of the data call other than the urgent call, activates "Tbarring (control timer)" only for a duration (Tbarring) calculated from ac-BarringTime included in the ac-BarringForMO-Data. Moreover, during the time period in which the Tbarring is active, the mobile station UE controls call origination of the data call other than the urgent call. FIG. 1 shows an example of operations performed inside a mobile station UE when the ACB for Data is invoked.

Moreover, in the LTE system, from the Release-9, SSAC (Service Specific Access Control) is specified as a method for controlling call origination of a VoLTE (Voice over LTE) call (e.g., IMS PS voice call) in Multi Media TELephony (MMTEL) function in a mobile station UE (e.g., see Non-Patent Document 1). FIG. 2 shows an example of operations performed inside a mobile station UE and by a mobile communication network (shown by "NW" in the drawing) when the SSAC is invoked.

As shown in FIG. 2, in the SSAC, the mobile station UE determines, based on the ac-BarringFactor included in ssac-BarringForMMTEL-Voice or ssac-BarringForMMTEL-Video included in the SIB2, whether to control call origination of a VoLTE call. Specifically, the mobile station UE, upon determining to control call origination of the VoLTE call, activates the "Tbarring (control timer)" only for a time duration (Tbarring) calculated from the ac-BarringTime included in the ssac-BarringForMMTEL-Voice or the ssac-BarringForMMTEL-Video. Moreover, during the time period in which the Tbarring is active, the mobile station UE controls call origination of the VoLTE call.

In the LTE system, from the Release-8, RRC Connection Reject control is specified by which a mobile communication network (specifically, a radio base station eNB) can reject a radio access thereto by a mobile station UE depending on an operation policy. FIG. 3 shows an example of operations performed inside a mobile station UE and by a network when the RRC Connection Reject control is invoked.

As shown in FIG. 3, a mobile station UE, upon receiving RRC Connection Reject from a mobile communication network, activates "T302 (wait timer)" only for a time duration (waitTime) notified of by the RRC Connection Reject. Moreover, during the time period in which the T302 is active, the mobile station UE does not execute a radio access. FIG. 4 shows an example of operations performed inside a mobile station UE while the Tbarring or the T302 is active.

PRIOR ART DOCUMENT

Non-Patent Document

Non-Patent Document 1:
3GPP TS 36.331 V9.10.0 Subclause 5.3.3.10, Handling of SSAC related parameters, 3rd Generation Partnership Project; Technical Specification Group Radio Access Network; Evolved Universal Terrestrial Radio Access (E-UTRA); Radio Resource Control (RRC); Protocol specification (Release 9), 3GPP, March, 2012.

SUMMARY OF THE INVENTION

The conventional LTE system assumes a situation in which a plurality of call origination controls have been invoked simultaneously. For example, a situation where congestion and failure that spans over a plurality of nodes has occurred, such as at the time of a disaster, is assumed. There are situations in which there is a need to control only a particular service, e.g., there is a need to control a packet communication service, but exclude an IMS PS voice call from such control.

In the conventional LTE system, when the ACB for Data and the SSAC have been invoked simultaneously, or when the SSAC and the RRC Connection Reject control have been invoked simultaneously, the VoLTE call must break through both the call origination controls. That is, the control becomes excessive on the VoLTE call as a duplicated call origination control is performed. Thus, the call origination control as intended by an operator is difficult to execute.

FIG. 5 is a diagram for explaining the problems arising due to the duplicated call origination control in the conventional LTE system. As shown in FIG. 5, assuming a communication success rate of the IMS PS voice call by a mobile station UE to be 80% and a communication success rate of the data call (other than the VoLTE call) other than the urgent call by the mobile station UE to be 50%, when a communication success rate by the SSAC is set to 80% and a communication success rate of the ACB for Data or the RRC Connection Reject control is set to 50%, the communication success rate of the data call (other than the VoLTE call) other than the urgent call becomes 50%; however, the communication success rate of the IMS PS voice call becomes 40% (80% ×50%), and the call origination control based on the communication success rate as intended by the operator cannot be performed.

FIGS. 6 and 7 show examples of operations performed inside a mobile station UE and by a network when the SSAC and the ACB for Data are invoked in the conventional LTE system. FIGS. 8 and 9 show examples of operations performed inside a mobile station UE and by a network when the SSAC and the RRC Connection Reject are invoked in the conventional LTE system. As shown in FIGS. 6 to 9, a duplicated control is performed on the IMS PS voice call originated by the mobile station UE.

Furthermore, there is a problem in the conventional LTE system that a call origination control cannot be performed per service in accordance with congestion of the network. For example, when a disaster such as an earthquake occurs, there is a need to allow only the transmission of the short message service (SMS), the message board for use in disaster, and the voice call. However, when the ACB for Data or the RRC Connection Reject control is invoked, a call origination request, along with other services (e.g., Web browsing and a video hosting service), is also controlled.

The present invention has been made in view of the above discussion. It is an object of the present invention to provide a mobile station, a mobile communication system, and a network device that can realize more appropriate call origination control per service as intended by the operator.

According to a first aspect of the present invention, a mobile station includes an MMTEL function unit, an NAS function unit, and an RRC function unit. The RRC function unit receives from a mobile communication network notification information including access control information for data call to control call origination of a data call other than an urgent call and access control information for VoLTE call to control call origination of a VoLTE call, the MMTEL function unit upon detecting a call origination request for the VoLTE call, determines, based on the access control information for VoLTE call acquired from the RRC function unit, possibility of call origination of the VoLTE call, and upon determining that the call origination of the VoLTE call is possible, transmits to the NAS function unit a bearer request to request establishment of a bearer for the VoLTE call, the NAS function unit, in accordance with the bearer request, transmits to the RRC function unit a service request to notify that the call origination is from the MMTEL function unit, the RRC function unit, in accordance with the service request, based on one of the access control information for data call and a control timer, transmits an RRC connection request to the mobile communication network without determining the possibility of the call origination of the VoLTE call.

According to a second aspect of the present invention, a mobile station includes an MMTEL function unit, an NAS function unit, and an RRC function unit. The RRC function unit receives from a mobile communication network notification information including access control information for VoLTE call to control call origination of a VoLTE call, the MMTEL function unit upon detecting a call origination request for the VoLTE call, determines, based on the access control information for VoLTE call acquired from the RRC function unit, possibility of call origination of the VoLTE call, and upon determining that the call origination of the VoLTE call is possible, transmits to the NAS function unit a bearer request to request establishment of a bearer for the VoLTE call, the NAS function unit, in accordance with the bearer request, transmits to the RRC function unit a service request to notify that the call origination is from the MMTEL function unit, and the RRC function unit, in accordance with the service request, based on a wait timer, transmits to the mobile communication network an RRC connection request to notify that the call origination is from the MMTEL function unit without determining the possibility of the call origination of the VoLTE call.

According to a third aspect of the present invention, a mobile communication system including a mobile station includes an MMTEL function unit, an NAS function unit, and an RRC function unit, and a mobile communication network. The RRC function unit receives from the mobile communication network notification information including access control information for VoLTE call to control call origination of a VoLTE call, the MMTEL function unit upon detecting a call origination request for the VoLTE call, determines, based on the access control information for VoLTE call acquired from the RRC function unit, possibility of call origination of the VoLTE call, and upon determining that the call origination of the VoLTE call is possible, transmits to the NAS function unit a bearer request to request establishment of a bearer for the VoLTE call, the NAS function unit, in accordance with the bearer request, transmits to the RRC function unit a service request to notify that the call origination is from the MMTEL function unit, the RRC function unit, in accordance with the service request, based on a control timer, transmits an RRC connection request to the mobile communication network without determining the possibility of the call origination of the VoLTE call, and the mobile communication network, even if a radio access from the mobile station is controlled, upon receiving the RRC connection request, transmits an RRC connection setting to the mobile station without transmitting an RRC connection reject.

According to a fourth aspect of the present invention, a mobile station includes an application function unit, an NAS function unit, and an RRC function unit. The application function unit transmits a call origination request for a predetermined service to the NAS function unit, the NAS function unit transmits to the RRC function unit a service request including a call origination service value indicating that the call origination request originated from the predetermined service, and the RRC function unit, when the call origination service value is included in the service request received from the NAS function unit, even if an access control has been invoked by a mobile communication network, transmits an RRC connection request to the mobile communication network.

According to a fifth aspect of the present invention, a network device included in a mobile communication network and that notifies a mobile station of an access control to the mobile communication network, wherein the network device, when the access control has been invoked, notifies the mobile station that a predetermined service is to be excluded from the access control.

According to a sixth aspect of the present invention, a mobile station includes an application function unit, an NAS function unit, and an RRC function unit. The application function unit transmits a call origination request for a predetermined service to the NAS function unit, the NAS function unit transmits to the RRC function unit a service request including a call origination service value indicating that the call origination request originated from the predetermined service, the RRC function unit, when the call origination service value is included in the service request received from the NAS function unit, even if a wait timer based on a wait value notified of by an RRC connection reject from a mobile communication network is active, transmits an RRC connection request to the mobile communication network.

According to a seventh aspect of the present invention, a radio base station that executes an RRC connection setting based on an RRC connection request received from a mobile station, when a call origination service value indicating that a call origination request originated from a predetermined service is included in the RRC connection request, even if RRC Connection Reject control (RRC connection reject control) is in progress in which the RRC connection request is rejected to control call origination from the mobile station, accepts the RRC connection request and executes the RRC connection setting.

MODE FOR CARRYING OUT THE INVENTION

Figure 1:
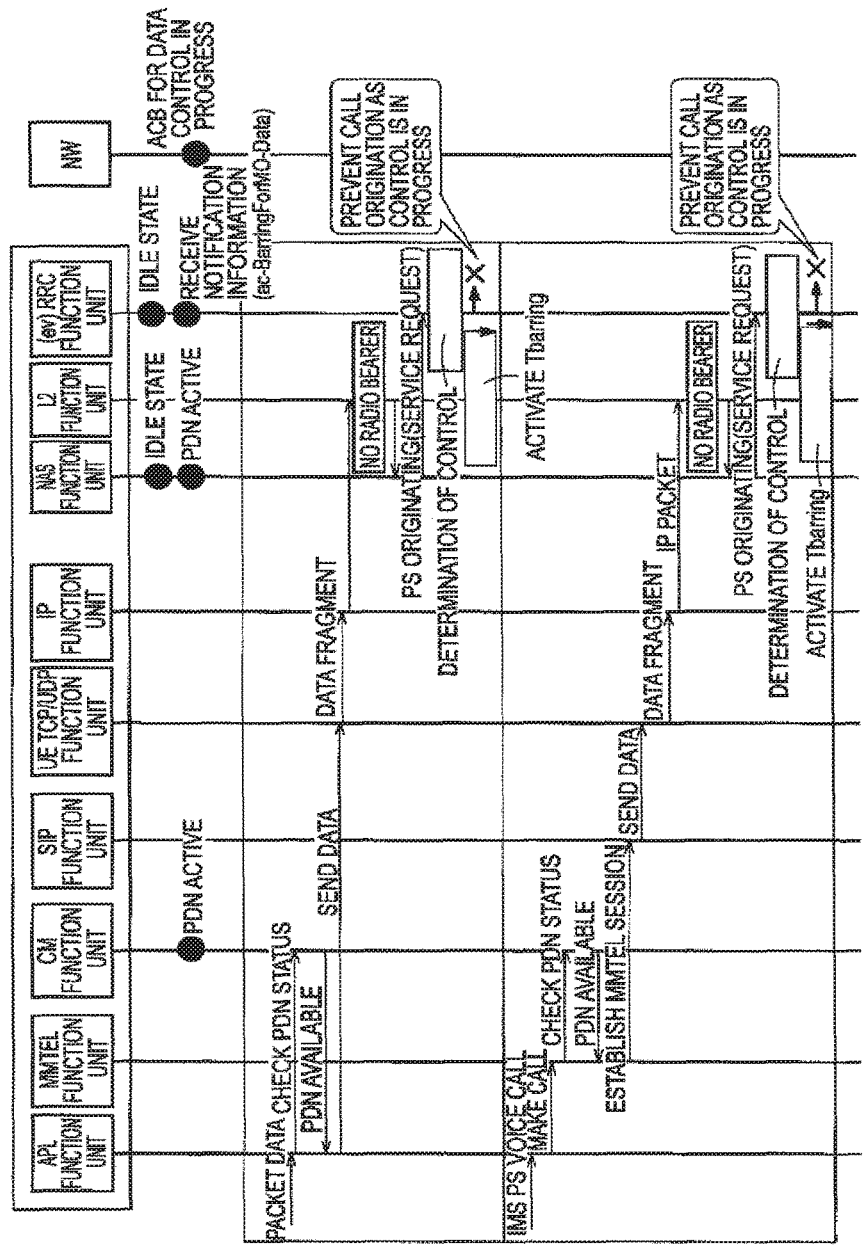
FIG. 1 shows an example of operations performed inside a mobile station UE when the conventional ACB for Data is invoked.
Figure 2:
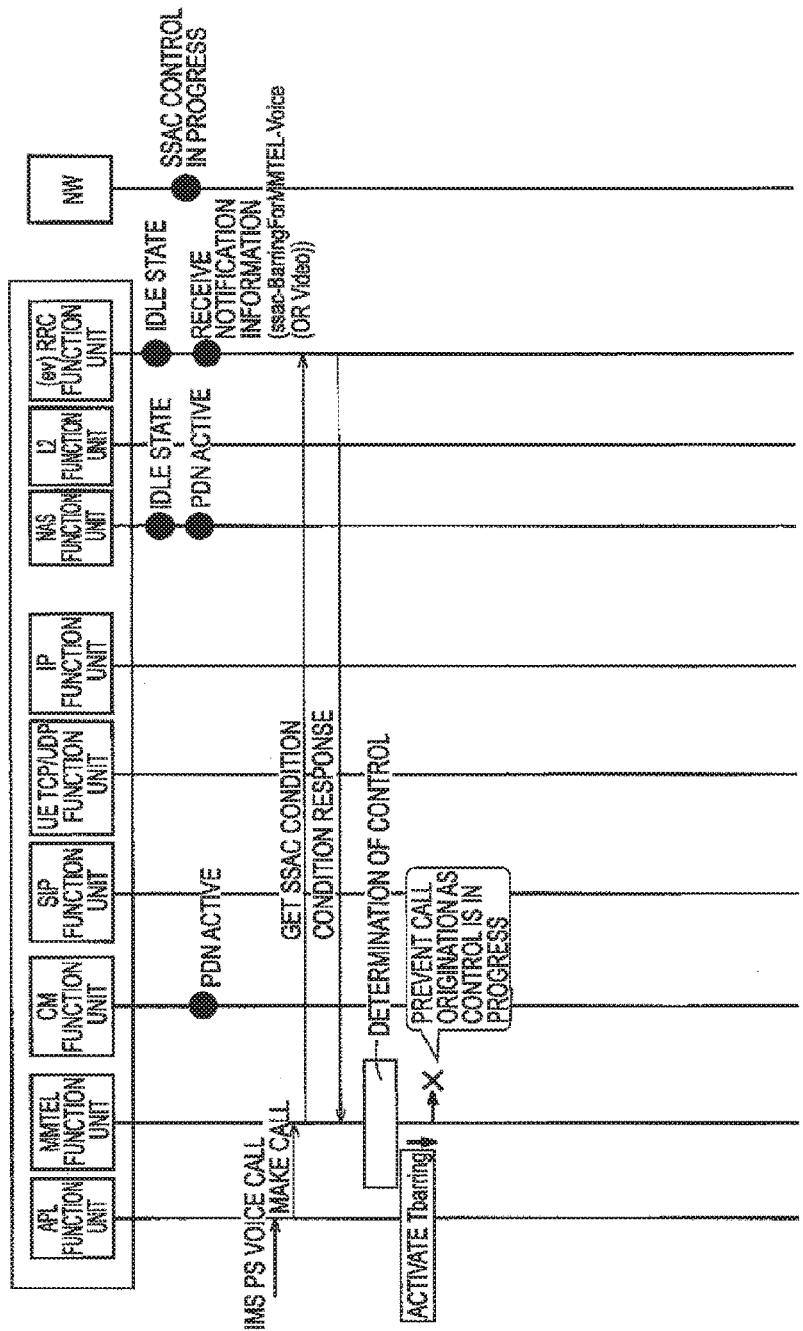
FIG. 2 shows an example of operations performed inside a mobile station UE and by a mobile communication network when the conventional SSAC is invoked.
Figure 3:
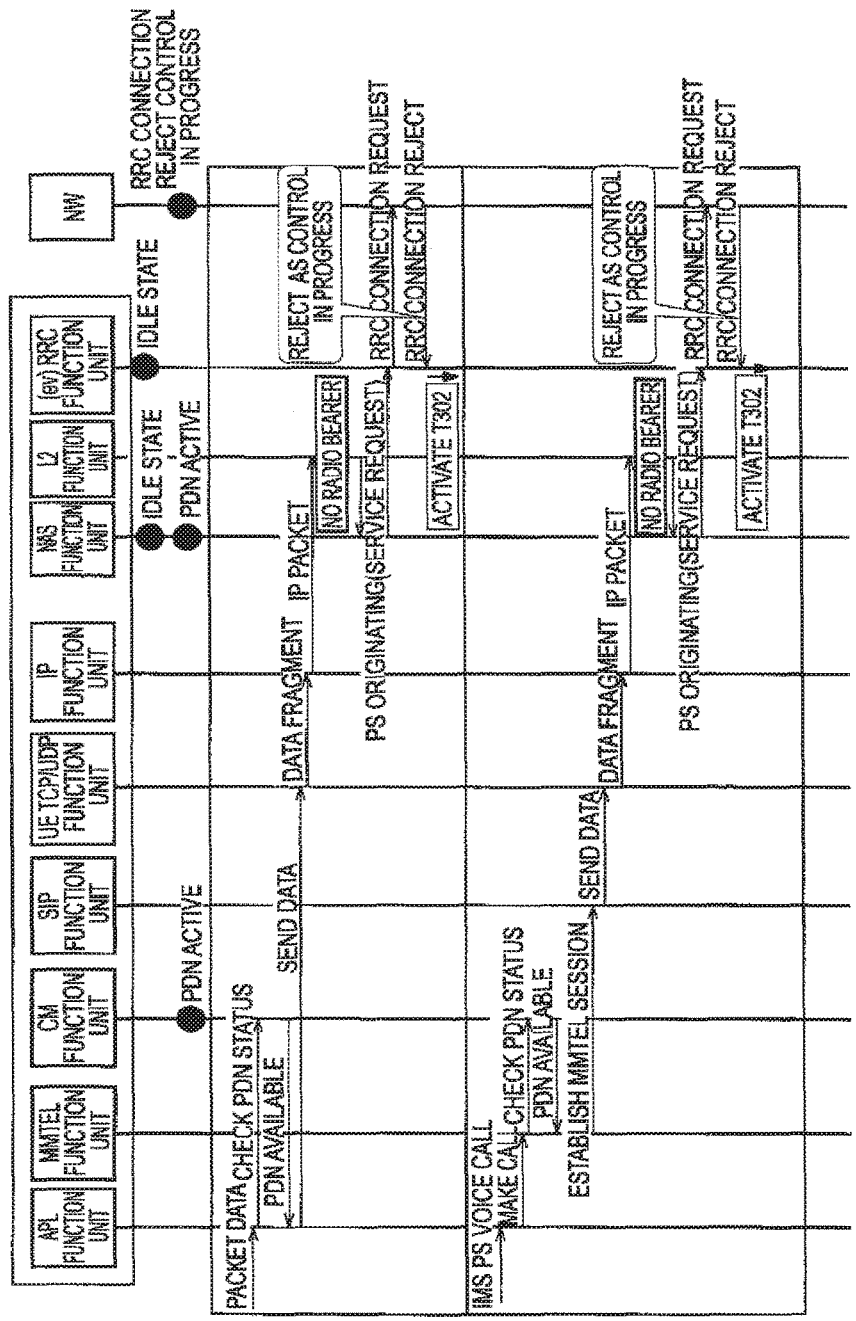
FIG. 3 shows an example of operations performed inside a mobile station UE and by a network when the conventional RRC Connection Reject control is invoked.
Figure 4:
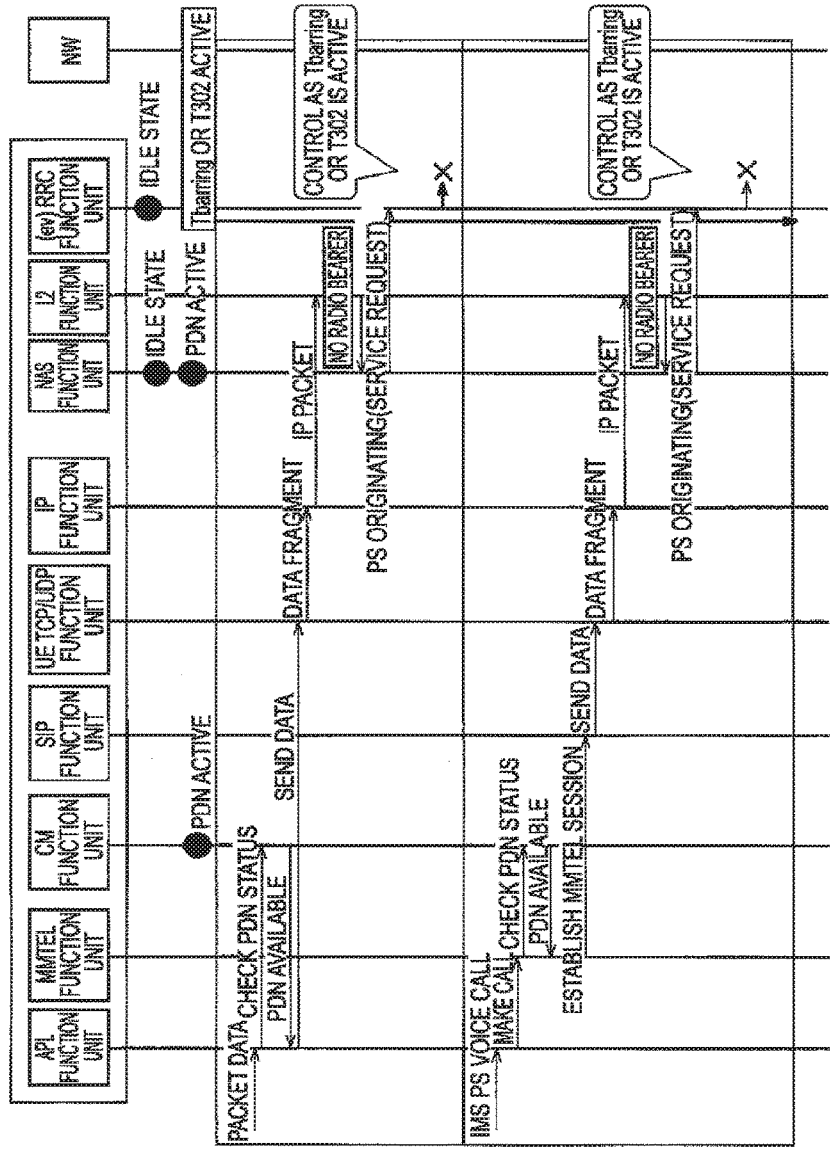
FIG. 4 shows an example of operations performed inside a mobile station UE when the conventional Tbarring or T302 is active.
Figure 5:
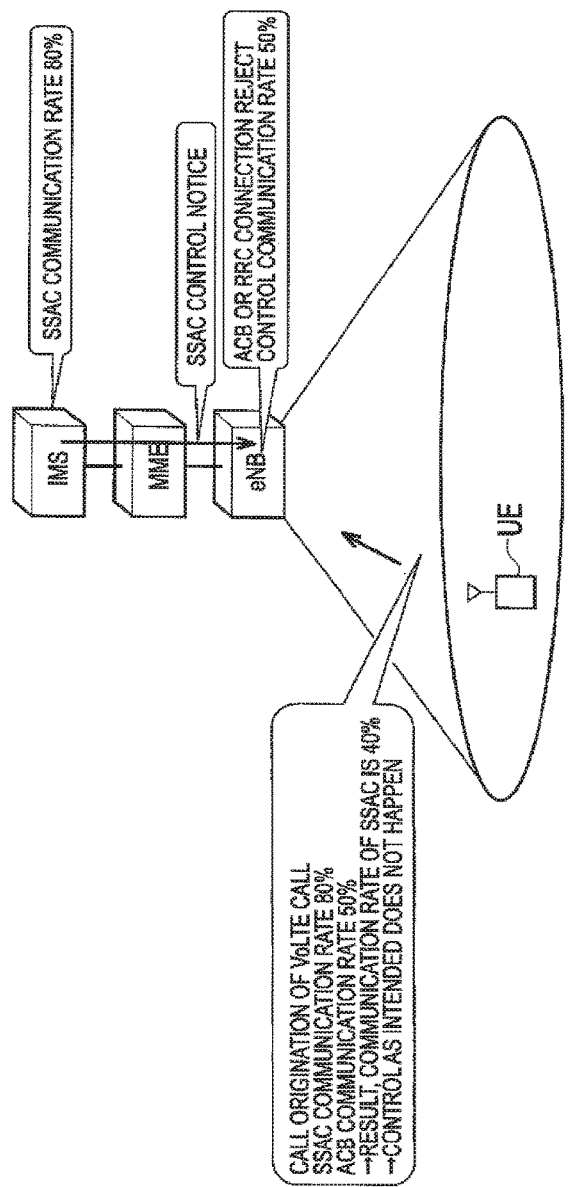
FIG. 5 is a diagram for explaining the problems arising due to a duplicated call origination control in the conventional LTE system.
Figure 6:
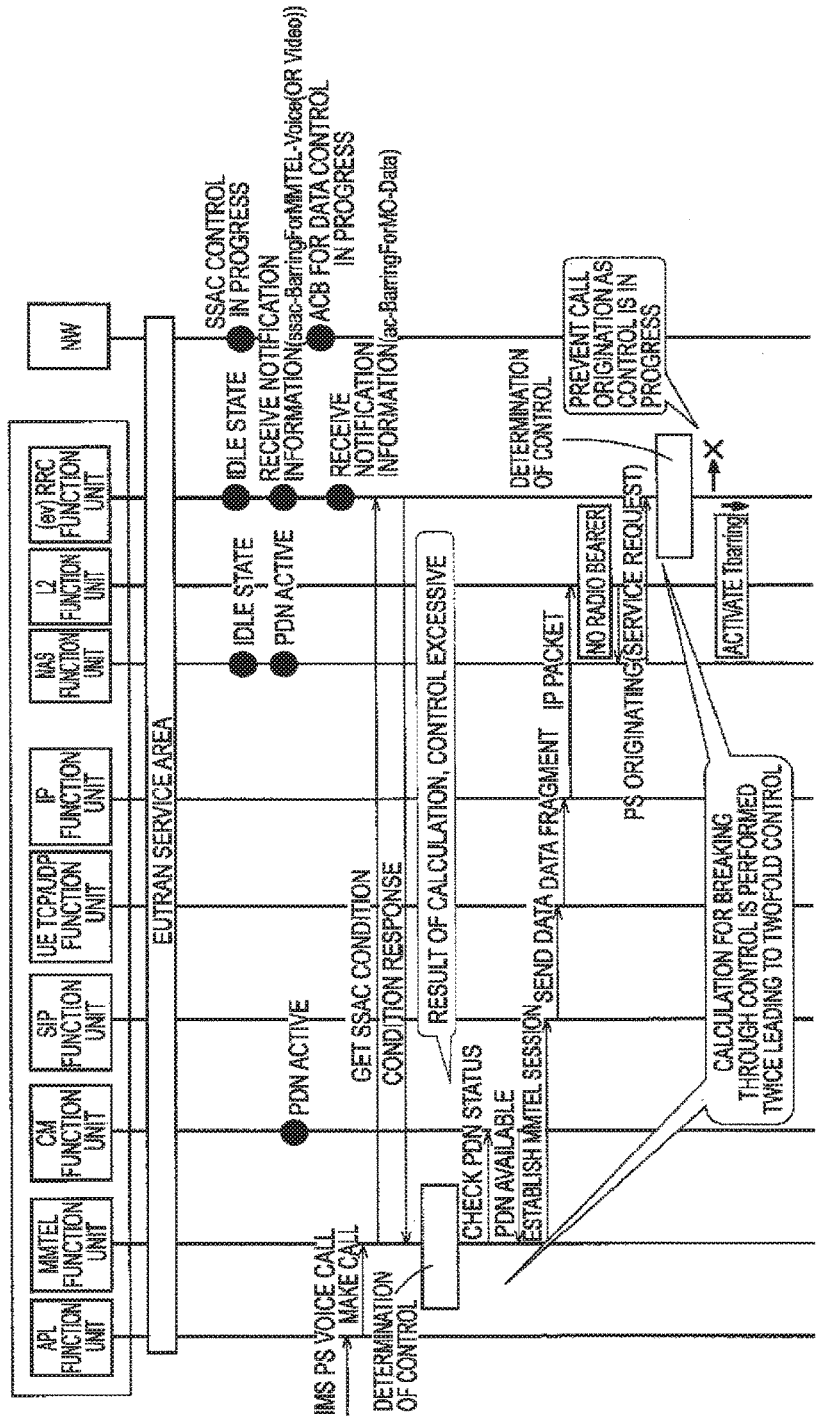
FIG. 6 shows an example of operations performed inside a mobile station UE and by a network when the SSAC and the ACB for Data are invoked in the conventional LTE system.
Figure 7:
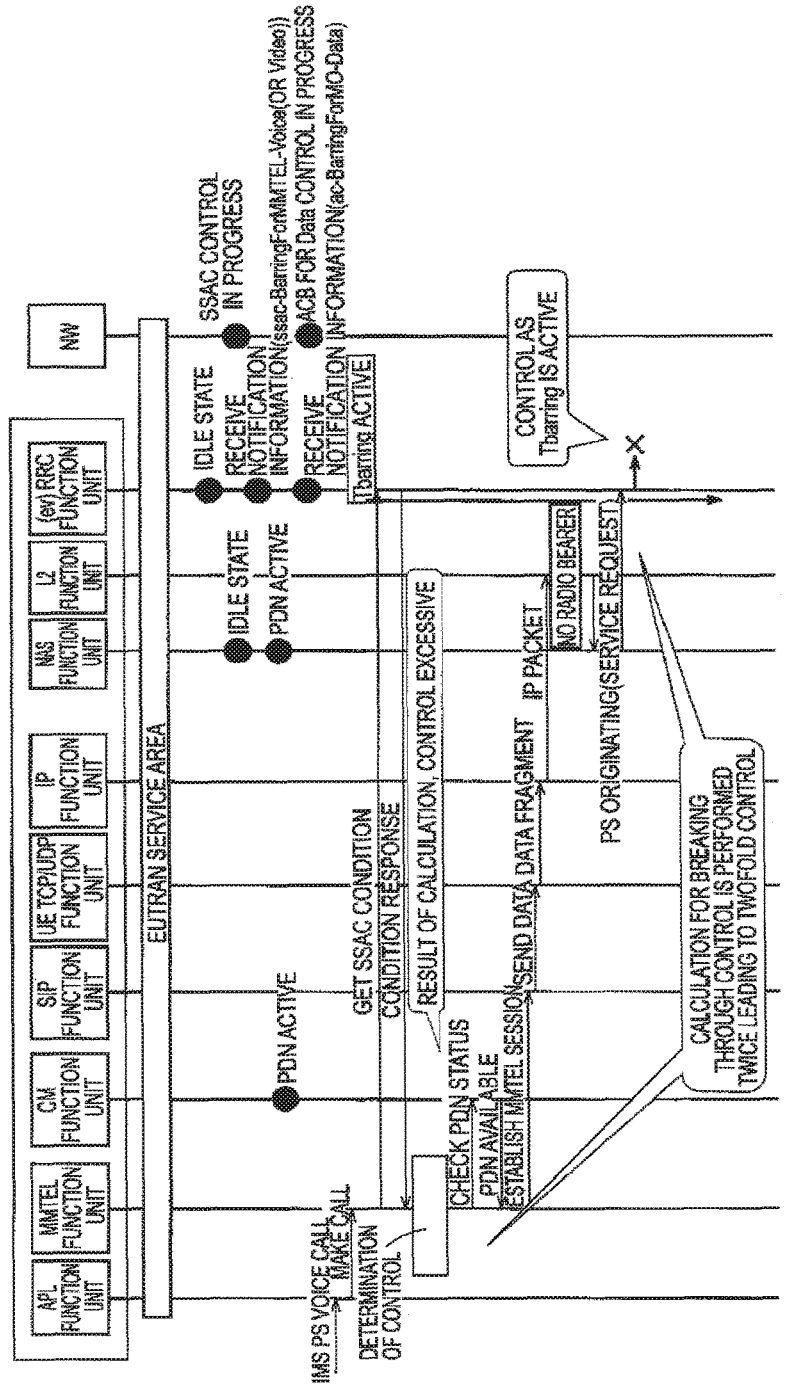
FIG. 7 shows an example of operations performed inside a mobile station UE and by a network when the SSAC and the ACB for Data are invoked in the conventional LTE system.
Figure 8:
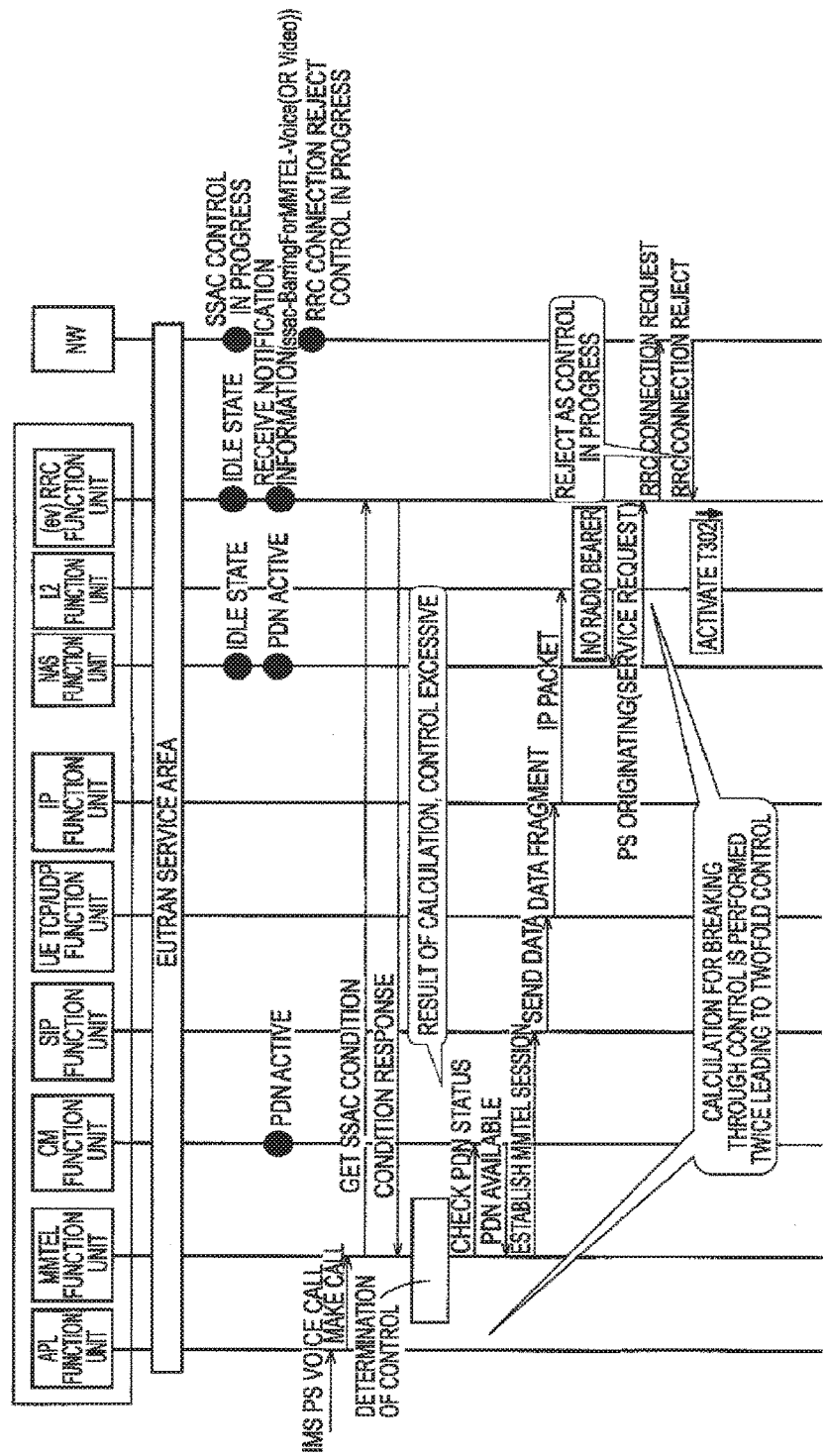
FIG. 8 shows an example of operations performed inside a mobile station UE and by a network when the SSAC and the RRC Connection Reject are invoked in the conventional LTE system.
Figure 9:
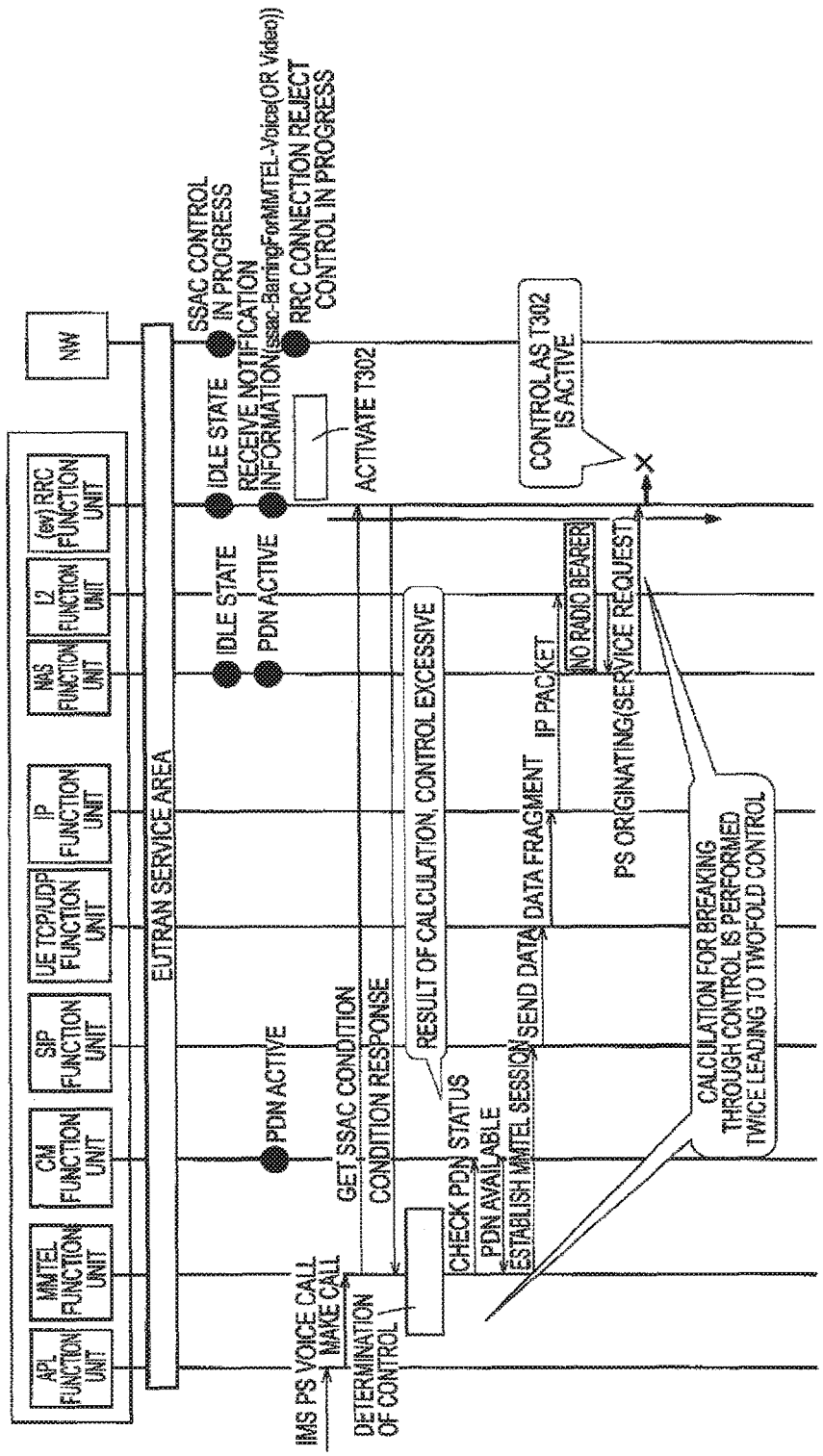
FIG. 9 shows an example of operations performed inside a mobile station UE and by a network when the SSAC and the RRC Connection Reject is invoked in the conventional LTE system.

Exemplary embodiments of the present invention are explained below. With regard to the representation in the drawings, the same or similar components have been denoted by the same or similar reference numerals/signs. The drawings are only schematic and the ratios of dimensions and the like shown in the drawings may differ from the actual ratios.

Therefore, specific dimensions and the like shall be determined after taking the following explanation into account. Moreover, it is a matter of course that the relations or ratios of mutual dimensions may differ among the drawings.

First Embodiment (1) Overall Structure of Mobile Communication System

Figure 10:
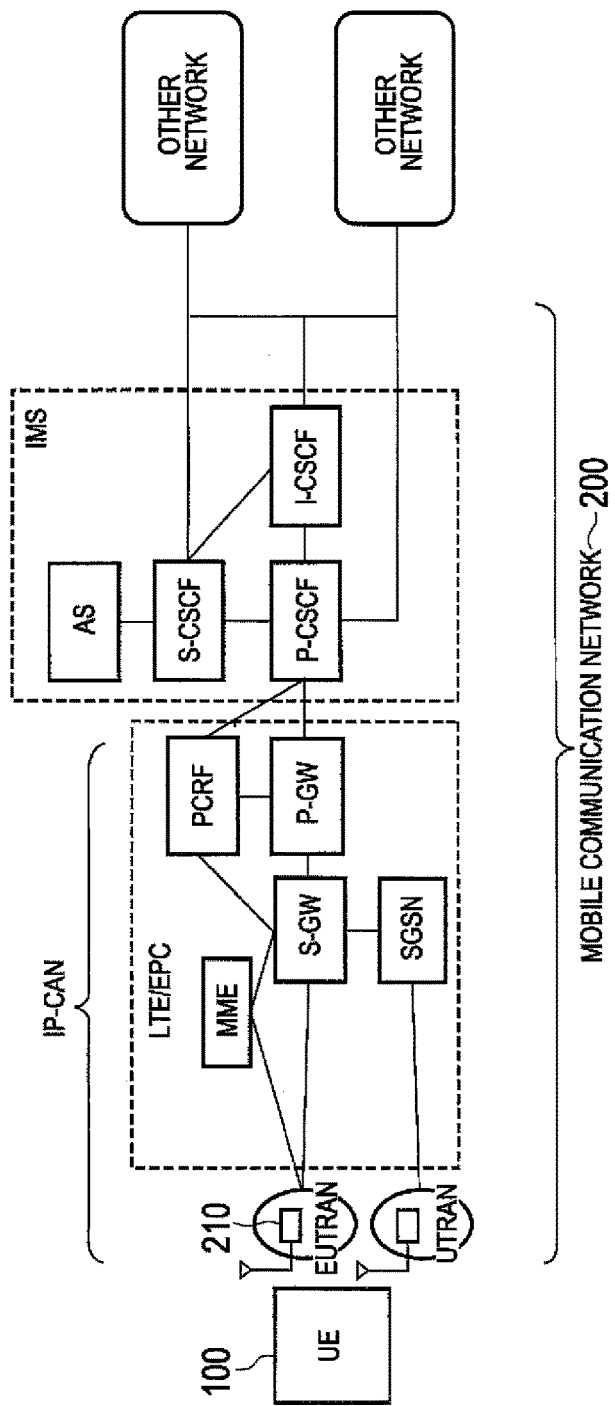
FIG. 10 is a diagram of an overall structure of a mobile communication system according to a first embodiment of the present invention.
Figure 11:
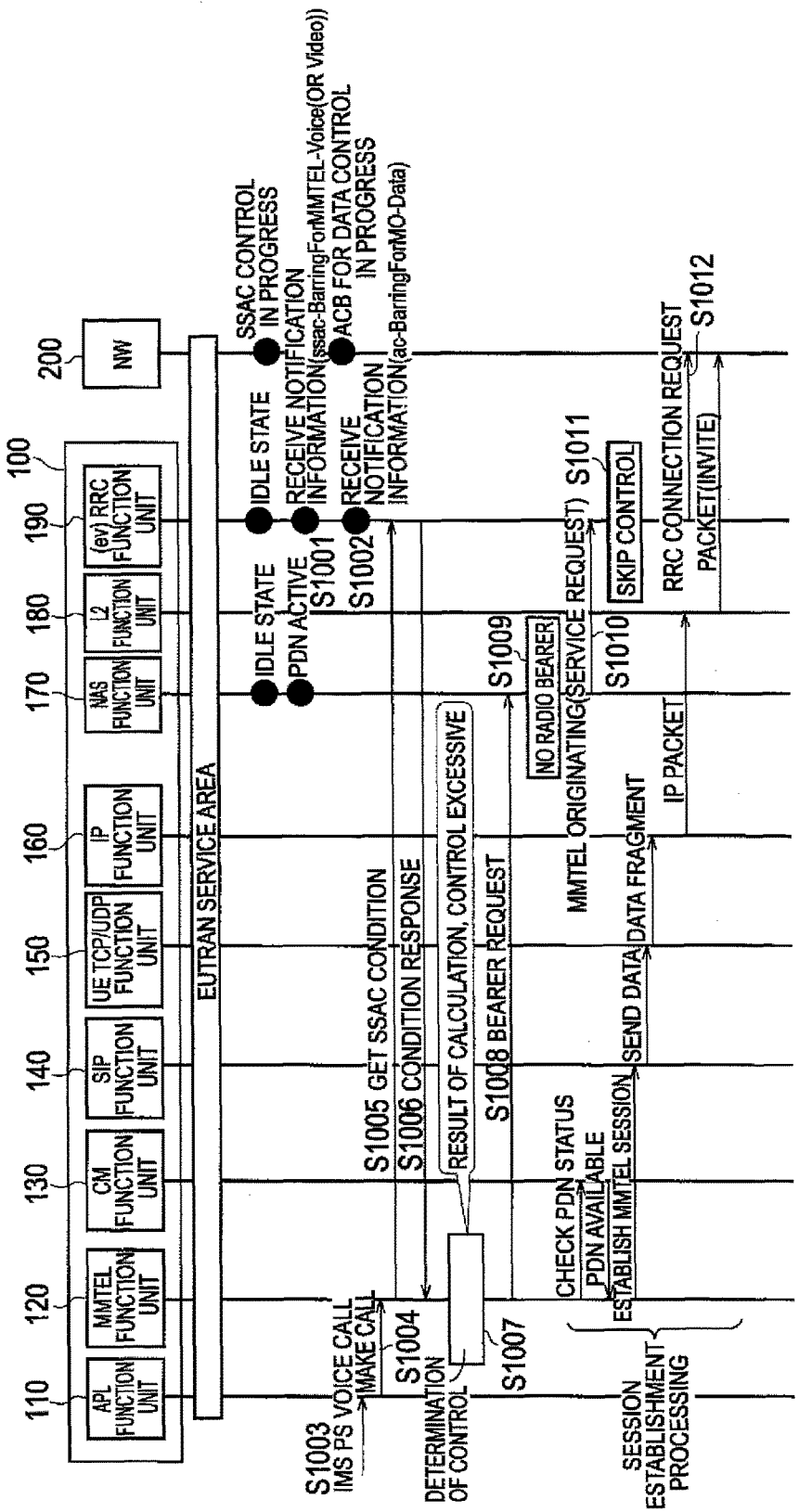
FIG. 11 is a sequence diagram that shows operations performed by the mobile communication system according to the first embodiment.

Referring now to FIGS. 10 and 11, a mobile communication system according to the first embodiment of the present invention is explained below. FIG. 10 is a diagram of an overall structure of the mobile communication system according to the present embodiment. FIG. 11 is a sequence diagram that shows operations performed by the mobile communication system according to the present embodiment.

As shown in FIG. 10, a mobile communication system according to the present embodiment is a mobile communication system of the LTE system and the 3G system and includes IMS (IP Multimedia Subsystem) and IP-CAN (IP-Connectivity Access Network).

The IP-CAN is a network that provides transport functions, such as a SIP (Session Initiation Protocol) signal or an audio signal, and it is the core network of the LTE system or EPC (Evolved Packet Core) system.

The IP-CAN includes a mobility management node MME, a gateway device S-GW/P-GW, a packet switch SGSN, a logical node PCRF that performs control for QoS of user data signal transfer, fee charging, and the like.

The IP-CAN includes, as a radio access network, UTRAN (Universal Terrestrial Radio Access Network), EUTRAN (Enhanced UTRAN), and the like.

The UTRAN includes a radio base station NodeB, a radio link control station RNC, and the like. The EUTRAN includes a radio base station eNB210 (hereinafter, "eNB 210"). In the present embodiment, a mobile communication network 200 is constructed by incorporating the IMS and the IP-CAN.

(2) Functional Block Configuration of Mobile Station 100

As shown in FIG. 11, a mobile station 100 (hereinafter, "UE 100") according to the present embodiment includes an APL function unit 110, an MMTEL function unit 120, a CM function unit 130, an SIP function unit 140, a UE TCP/UDP function unit 150, an IP function unit 160, an NAS function unit 170, an L2 function unit 180, and an RRC function unit 190. The UE 100 is constructed by hardware including a CPU, a memory, and the like, and it is a function unit that is implemented by this hardware.

The APL function unit 110 (Application function unit) is an application program installed in the UE 100, and it accepts user operations.

The MMTEL function unit 120 controls telephony service in the IMS. The CM function unit 130 (Connection Manager function unit) manages whether a connection has been established in PDN (Packet Date Network).

The SIP function unit 140 performs a processing in accordance with SIP that is a call control protocol of IMS session such as "REGISTER" and "INVITE".

The UE TCP/UDP function unit 150 (UE Transmission Control Protocol/User Datagram Protocol function unit) performs a processing in accordance with TCP/UDP that is a protocol that performs re-transmission control. The IP function unit 160 (Internet Protocol function unit) performs a processing in accordance with IP that is a protocol relating to control of an IP address and fragmentation.

The NAS function unit 170 (Non Access Stratum function) performs a processing in accordance with NAS that is a protocol relating to control such as call control and location registration. The L2 function unit 180 (Layer2 function unit) performs processing in a data link layer that performs re-transmission, error correction, and the like.

The RRC function unit 190 (Radio Resource Control function unit) performs control of setting and release of a radio connection. In the eNB 210, an evRRC function unit corresponds to the RRC function.

(3) Operations of Mobile Communication System

Referring now to FIG. 11, the operations of the mobile communication system according to the present embodiment are explained. A case of an IMS PS voice call is explained as an example; however, the mobile communication system according to the present embodiment is similarly applicable to a case of an IMS PS video call.

As shown in FIG. 11, the UE 100 is present in the EUTRAN service area. Specifically, the UE 100 is in "IDLE state" and "PDN Active state". It is assumed that, in the mobile communication network 200, both the SSAC (Service Specific Access Control) and the ACB for Data (Access Class Barring for Data) are invoked simultaneously.

The RRC function unit 190 acquires notification information from the mobile communication network 200. Specifically, the RRC function unit 190 acquires the ssac-BarringForMMTEL-Voice (or, ssac-BarringForMMTEL-Video) at Step S1001 and acquires ac-BarringForMO-Data at Step S1002.

The APL function unit 110, upon detecting a call origination request for the IMS PS voice call at Step S1003, at Step S1004, transmits "Make call" to the MMTEL function unit 120 to notify the MMTEL function unit 120 of a call origination request for the IMS PS voice call.

The MMTEL function unit 120, upon detecting the call origination request for the IMS PS voice call, i.e., the Make call, at Step S1005, transmits "Get SSAC condition" to the RRC function unit 190.

The RRC function unit 190 transmits, based on the Get SSAC condition received at Step S1006, "Condition response" to the MMTEL function unit 120 to notify the MMTEL function unit 120 of the acquired ssac-BarringForMMTEL-Voice.

The MMTEL function unit 120 acquires the ssac-BarringForMMTEL-Voice via the received Condition response. At Step S1007, the MMTEL function unit 120 determines possibility of call origination of the IMS PS voice call based on the ssac-BarringForMMTEL-Voice.

The MMTEL function unit 120, upon determining that call origination of the IMS PS voice call is possible, before performing a session establishment process for the IMS PS voice call, at Step S1008, transmits "Bearer Request" to the NAS function unit 170 to request the NAS function unit 170 to establish a radio access bearer for the IMS PS voice call.

The NAS function unit 170, based on the Bearer Request received at Step S1009, upon determining that a radio access bearer does not exist, at Step S1010, transmits "Service Request" to the RRC function unit 190 to notify the RRC function unit 190 of "MMTEL originating" indicating a call origination from the MMTEL function unit 120 (i.e., a VoLTE call).

On the other hand, the NAS function unit 170, based on the Bearer Request, upon determining that a radio access bearer exists, because it is not the object of the ACB for Data, transmits an ordinary Service Request to the RRC function unit 190.

The RRC function unit 190, upon receiving a Service Request that notifies of MMTEL originating, at Step S1011, based on the ac-BarringForMO-Data or the Tbarring (control timer), without determining the possibility of call origination of the IMS PS voice call, in other words, skipping the control by the ACB for Data, at Step S1012, transmits "RRC Connection Request" to the mobile communication network 200.

On the other hand, the RRC function unit 190, upon receiving a Service Request that does not notify of the MMTEL originating, i.e., upon receiving the ordinary Service Request, at Step S1011, based on the ac-BarringForMO-Data or the Tbarring, determines possibility of call origination of the IMS PS voice call.

The Tbarring performed in the ACB is explained below. In the ACB, 0 to 9 are set as a general Access Class (AC), and a communication success rate is shown in a percentage by the ac-BarringFactor. For example, p00 (100% control=0% communication success rate) to p95 (95% communication success rate) is set. Furthermore, the ac-BarringTime means an average control time. The Tbarring is calculated by using the following mathematical formula.

$$\text{"Tbarring"}=(0.7+0.6*\text{rand})*ac\text{-BarringTime}$$

When there is a request for establishing RRC Connection while the Tbarring is active, control is performed. The ACB is executed in Access Stratum (AS) layer.

On the other hand, in the SSAC, a control parameter is acquired in the AS layer, and the acquired parameter is delivered to an upper layer (MMTEL/IMS) and control is performed in the upper layer. In the SSAC, a random number (rand) is generated in the UE 100, and no control is performed if the rand is equal to or lower than the ac-BarringFactor, on the other hand, control is performed if the rand is higher than the ac-BarringFactor.

(4) Actions and Advantageous Effects

According to the present embodiment, even if the SSAC and the ACB for Data have been invoked simultaneously, a duplicated control on the VoLTE call can be avoided, making it possible to realize control as intended by the operator.

Second Embodiment

Figure 12:
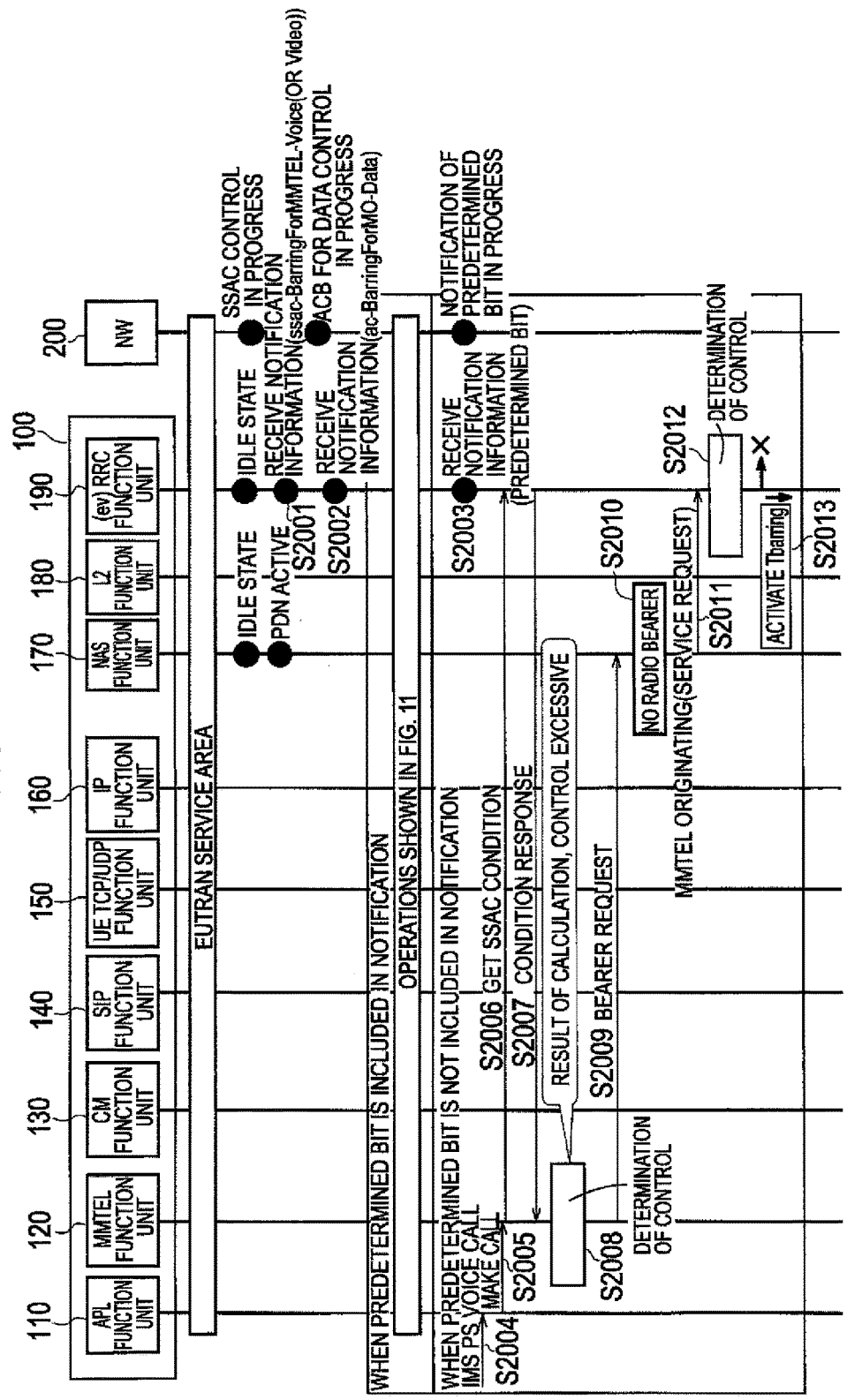
FIG. 12 is a sequence diagram that shows operations performed by a mobile communication system according to a second embodiment.

Referring now to FIG. 12, a mobile communication system according to a second embodiment of the present invention is explained below focusing on the differences between the mobile communication systems according to the first and second embodiments.

(1) Operations of Mobile Communication System

FIG. 12 is a sequence diagram that shows operations performed by the mobile communication system according to the present embodiment. A case of the IMS PS voice call is explained as an example; however, the mobile communication system according to the present embodiment is similarly applicable, in the same manner as the first embodiment, to a case of the IMS PS video call.

As shown in FIG. 12, the UE 100 is in "IDLE state" and "PDN Active state". It is assumed that, in the mobile communication network 200, both the SSAC and the ACB for Data are invoked simultaneously.

The RRC function unit 190 acquires the ssac-BarringForMMTEL-Voice (or, ssac-BarringForMMTEL-Video) at Step S2001, and acquires ac-BarringForMO-Data at Step S2002.

When a predetermined bit is included in notification information (e.g., SIB2) acquired by the RRC function unit 190, a process procedure at Steps S1003 to S1012 (including a session establishment process) shown in FIG. 11 is performed.

On the other hand, when the predetermined bit is not included in the notification information (e.g., SIB2) acquired by the RRC function unit 190 (Step S2003), the following operation is performed.

The operations at Steps S2004 to S2011 are the same as those at Steps S1003 to S1010 shown in FIG. 11.

The RRC function unit 190, even if the Service Request that notifies of the MMTEL originating is received, when the predetermined bit is not included in the notification information (e.g., SIB2), at Step S2012, based on the ac-BarringForMO-Data or the Tbarring, determines possibility of call origination of the IMS PS voice call. That is, the RRC function unit 190 does not skip the control by the ACB for Data.

The RRC function unit 190, based on the ac-BarringForMO-Data, upon determining to perform control of call origination of the IMS PS voice call, activates the Tbarring at Step S2013.

(2) Actions and Advantageous Effects

According to the present embodiment, even if the SSAC and the ACB for Data have been invoked simultaneously, whether a function to avoid the duplicated control should be activated or not can be decided by the operator (mobile communication network). Even if a mobile station that has a function to avoid the duplicated control coexists with a mobile station that does not have the function to avoid the duplicated control, a consistency can be secured with the mobile station that does not have this function.

Furthermore, according to the present embodiment, because the operator can decide whether to purposely perform the duplicated control, flexibility of operation by the operator is improved.

Third Embodiment

Figure 13:
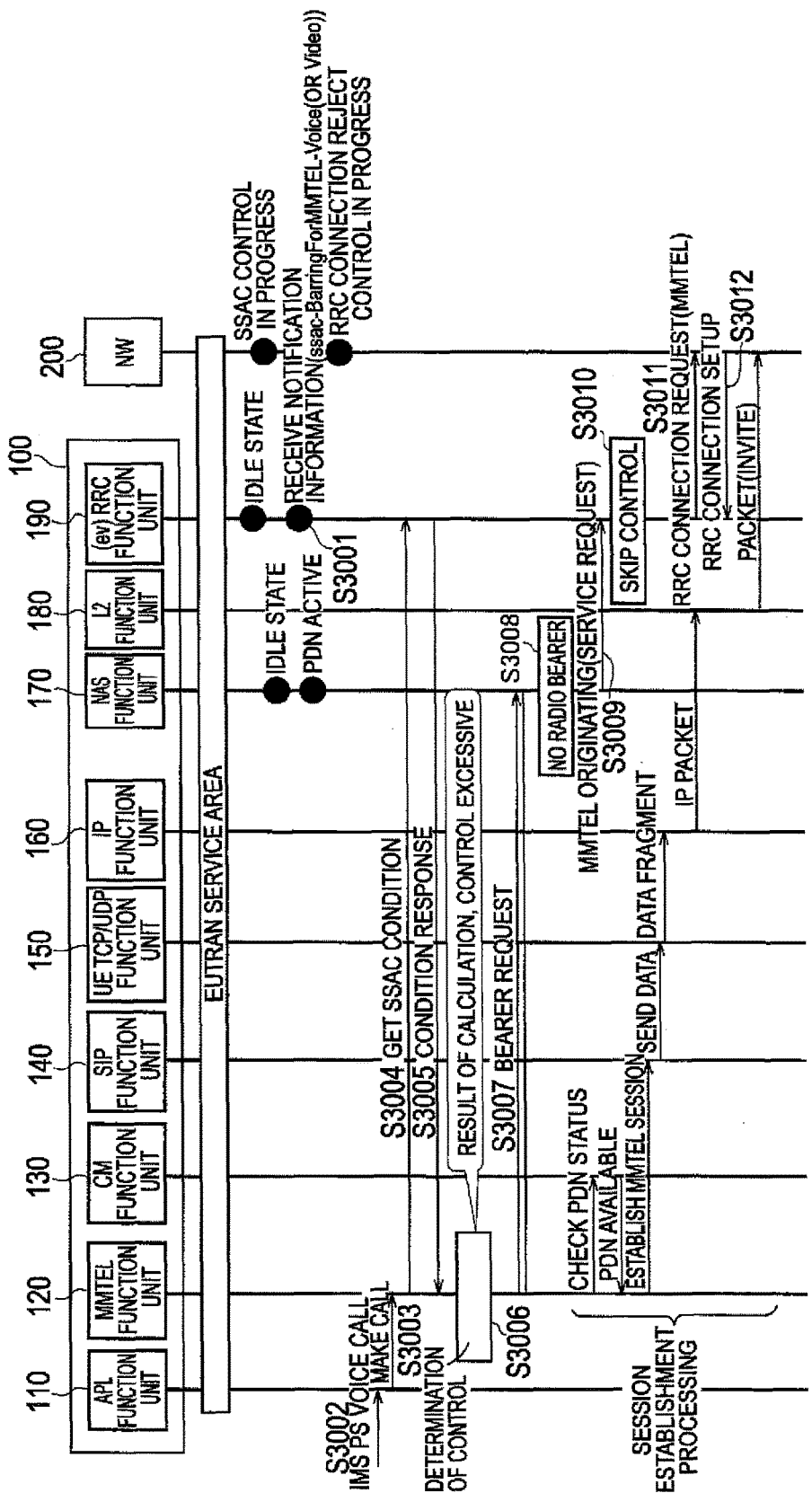
FIG. 13 is a sequence diagram that shows operations performed by a mobile communication system according to a third embodiment.

Referring now to FIG. 13, a mobile communication system according to a third embodiment of the present invention is explained below focusing on the differences between the mobile communication systems according to the first and third embodiments.

(1) Operations of Mobile Communication System

FIG. 13 is a sequence diagram that shows operations performed by the mobile communication system according to the present embodiment. A case of the IMS PS voice call is explained as an example; however, the mobile communication system according to the present embodiment is similarly applicable, in the same manner as the first embodiment, to a case of the IMS PS video call.

As shown in FIG. 13, the UE 100 is in "IDLE state" and "PDN Active state". It is assumed that, in the mobile communication network 200, both the SSAC and the RRC Connection Reject control are invoked simultaneously.

At Step S3001, the RRC function unit 190 acquires notification information, specifically, the ssac-BarringForMMTEL-Voice (or ssac-BarringForMMTEL-Video), from the mobile communication network 200.

The operations performed at Steps S3002 to S3010 are the same as those performed at Steps S1003 to S1011 shown in FIG. 11.

The RRC function unit 190, upon receiving the Service Request that notifies of the MMTEL originating, based on the ac-BarringForMO-Data or "T302" (wait timer), without determining the possibility of call origination of the IMS PS voice call at Step S3010, in other words, skipping the control by the ACB for Data, particularly without determining whether the ACB for Data has been invoked or not, at Step S3011, transmits "RRC Connection Request" that notifies of the MMTEL originating to the mobile communication network 200.

On the other hand, the RRC function unit 190, upon receiving the Service Request that does not notify of the MMTEL originating, i.e., upon receiving the ordinary Service Request, at Step S3010, based on the ac-BarringForMO-Data or the T302, determines possibility of call origination of the IMS PS voice call.

Moreover, the RRC function unit 190, upon receiving the Service Request notifying of the MMTEL originating, and only when the predetermined bit is included in the acquired notification information (e.g., SIB2), is allowed to skip the control based on the T302.

Even if the RRC Connection Reject control is in progress, the mobile communication network 200, i.e., the evRRC function unit of the eNB 210, at Step S3012, upon receiving the RRC Connection Request notifying of the MMTEL originating, transmits "RRC Connection Setup" to the UE 100 without transmitting the RRC Connection Reject.

(2) Actions and Advantageous Effects

According to the present embodiment, even if the SSAC and the RRC Connection Reject control have been invoked simultaneously, the duplicated control on the VoLTE call can be avoided, making it possible to realize control as intended by the operator.

Fourth Embodiment

Figure 14:
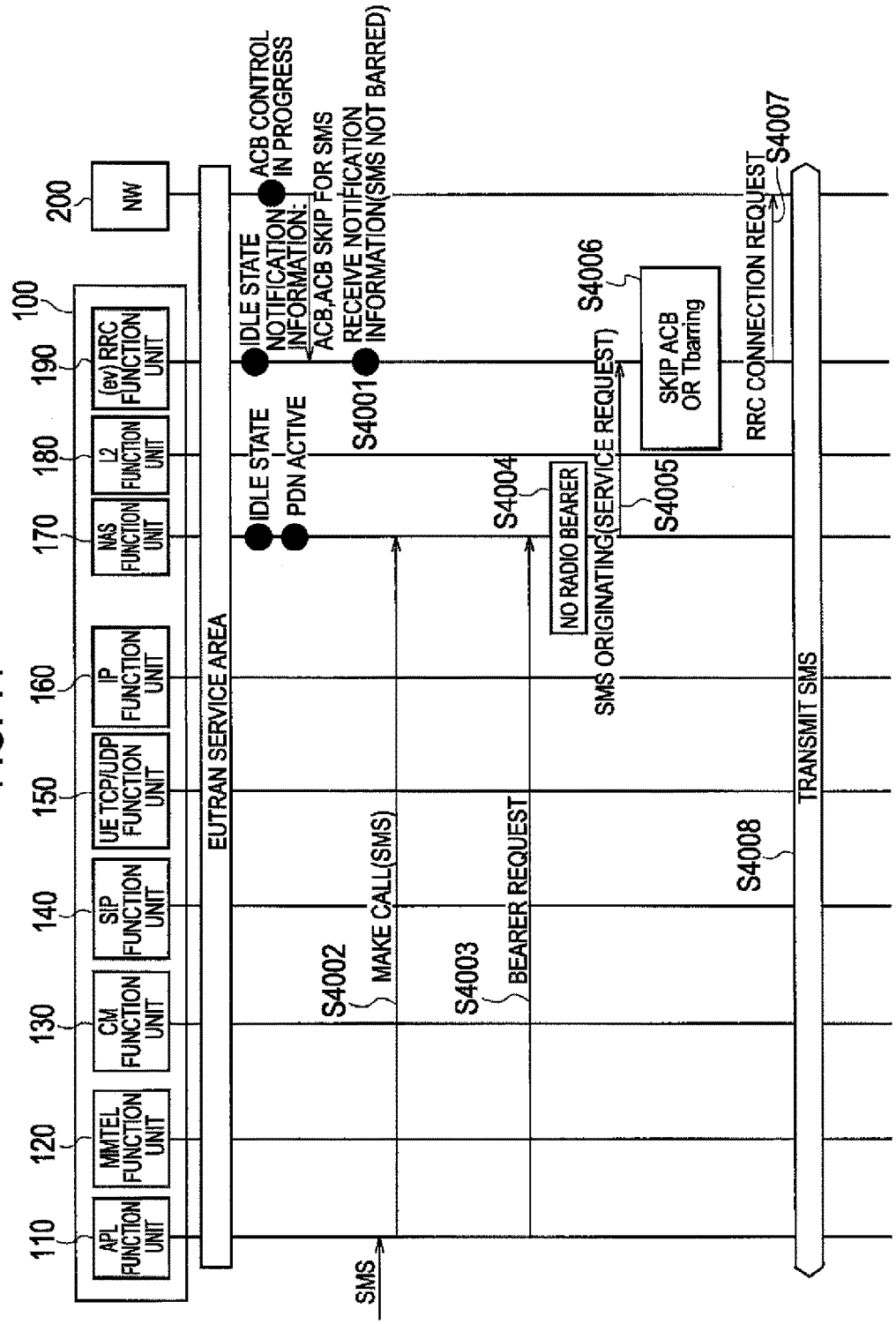
FIG. 14 is a sequence diagram that shows operations performed by a mobile communication system according to a fourth embodiment.
Figure 15:
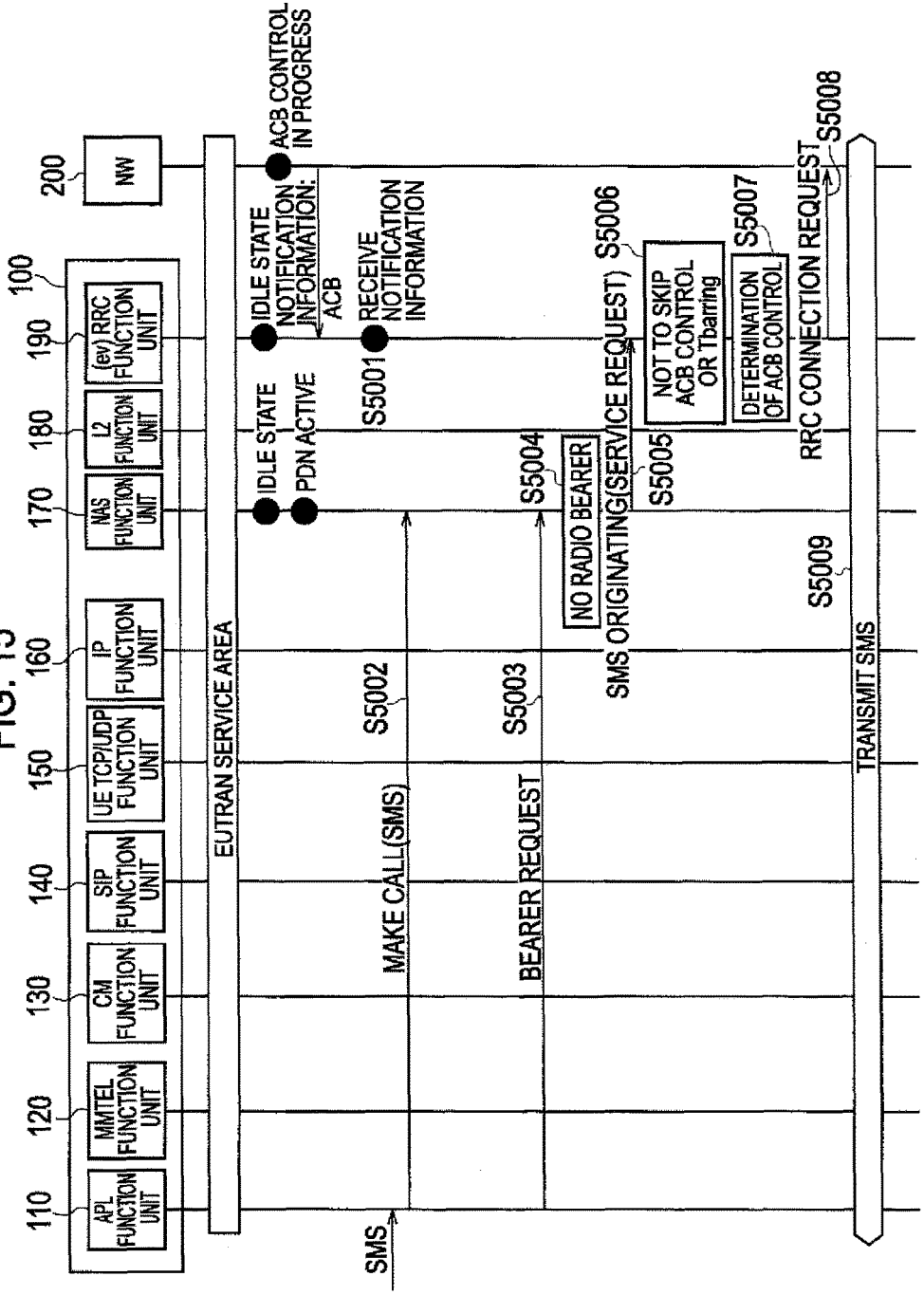
FIG. 15 is a sequence diagram that shows operations performed by the mobile communication system when it is not notified from a mobile communication network 200 in the fourth embodiment that SMS is to be excluded (skip for SMS) from the control by the ACB.
Figure 16:
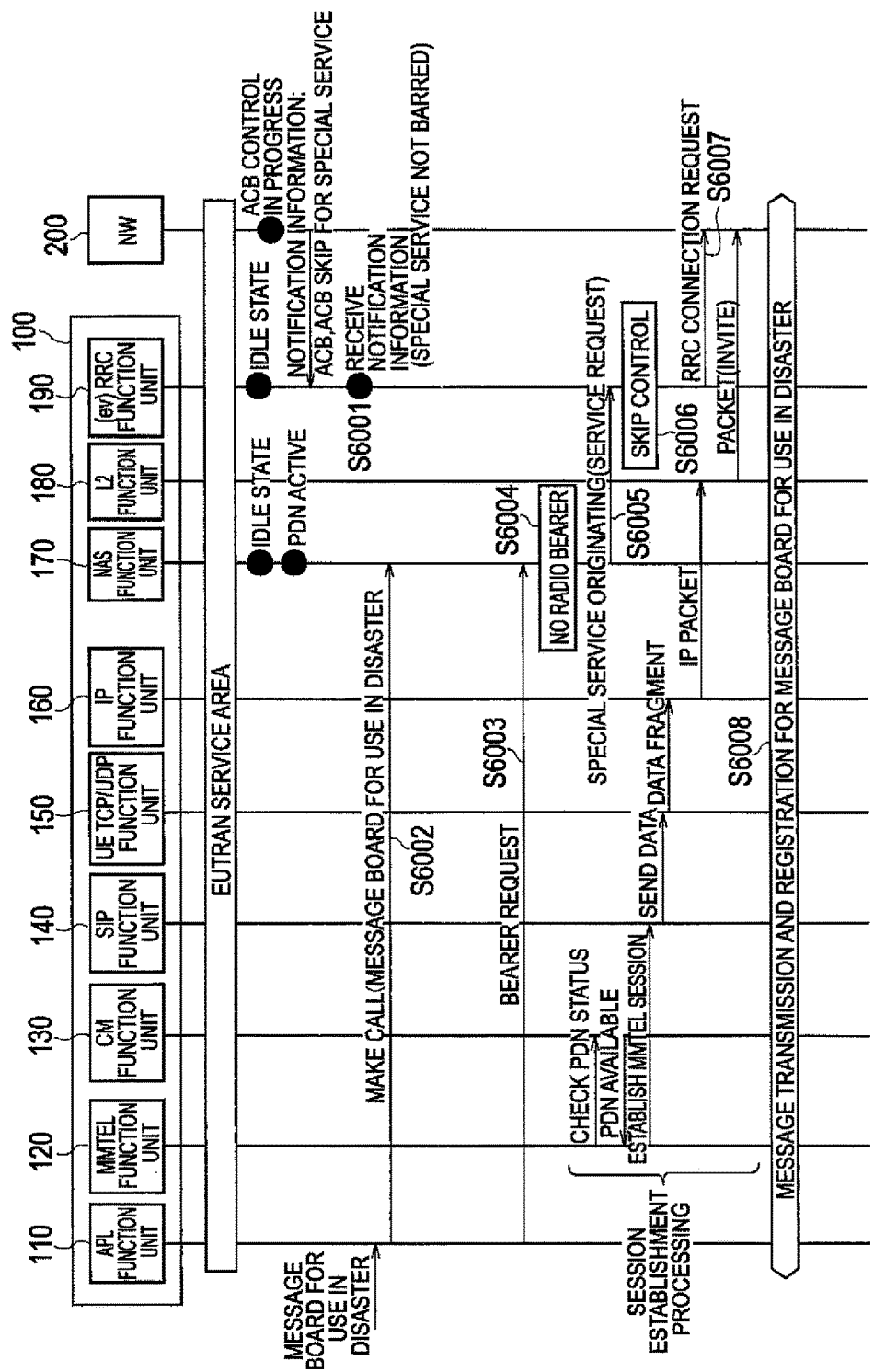
FIG. 16 is a sequence diagram that shows other operations performed by the mobile communication system according to the fourth embodiment.

Referring now to FIGS. 14 to 16, a mobile communication system according to a fourth embodiment of the present invention is explained below focusing on the differences between the mobile communication systems according to the first and fourth embodiments.

(1) Operations of Mobile Communication System

FIG. 14 is a sequence diagram that shows operations performed by the mobile communication system according to the present embodiment. In the mobile communication system according to the present embodiment, when the ACB (Access Control Barring) has been invoked, a predetermined service, specifically a call origination request originating from the short message service (SMS), is only excluded from the control by the ACB to permit the call origination request.

As shown in FIG. 14, the UE 100 is in "IDLE state" and "PDN Active state". The mobile communication network 200, at Step S4001, notifies the UE 100, by using the notification information, to invoke the ACB (access control) and that an SMS is excluded from the control by the ACB (skip for SMS). Specifically, the network device (e.g., the eNB 210 or SMSC (SMSCenter)) that is included in the mobile communication network 200 and that notifies the UE 100 of an access control on the mobile communication network 200, when the ACB has been invoked, notifies the UE 100 that an SMS (a predetermined service) is excluded from the control by the ACB.

The APL function unit 110, upon detecting a call origination request of the SMS, at Step S4002, transmits Make call to the NAS function unit 170 to notify of the call origination request. Furthermore, at Step S4003, the APL function unit 110 transmits Bearer Request to the NAS function unit 170 inquiring whether a radio access bearer exists. Specifically, the APL function unit 110 transmits an establishment request of the radio access bearer to the NAS function unit 170.

The NAS function unit 170, based on the received Bearer Request, upon determining that there is no radio access bearer (IDLE state), at Step S4005, transmits to the RRC function unit 190 the Service Request including "SMS originating" indicating that the call origination request has originated from the SMS (call originating service value).

The RRC function unit 190, when the SMS originating is included in the Service Request received from the NAS function unit 170, at Step S4006, skips the ACB even if the ACB has been invoked by the mobile communication network 200. Specifically, the RRC function unit 190 does not determine whether to perform the control even if a communication success rate based on the ACB has been notified of from the mobile communication network 200.

Furthermore, the RRC function unit 190, at Step S4007, transmits the RRC Connection Request to the mobile communication network 200. The RRC function unit 190, ignores the Tbarring and transmits the RRC Connection Request to the mobile communication network 200 even if the Tbarring (control timer) specifying the time period for performing call origination control based on the ACB is active. As a result, at Step S4008, an RRC connection is set, and sending of the SMS from the APL function unit 110 to the mobile communication network 200 is executed.

FIG. 15 is a sequence diagram of operations performed by the mobile communication system when it is not notified from the mobile communication network 200 to the mobile communication system that an SMS is to be excluded from the control by the ACB (skip for SMS).

As shown in FIG. 15, at Step S5001, the mobile communication network 200, by using the notification information, notifies the UE 100 to invoke the ACB (access control), but does not notify that the SMS is to be excluded from the control by the ACB (skip for SMS).

The operations performed at Steps S5002 to S5005 are the same as those performed at Steps S4002 to S4005 shown in FIG. 14.

The RRC function unit 190, at Step S5006, even if the SMS originating is included in the Service Request received from the NAS function unit 170, because it is not notified from the mobile communication network 200 that the SMS is to be excluded from the control by the ACB (skip for SMS), decides not to skip the ACB. Moreover, if the Tbarring is active, the RRC function unit 190 decides to perform the control in accordance with the Tbarring.

At Step S5007, the RRC function unit 190, based on a communication success rate (or the Tbarring) based on the ACB, determines whether call origination is possible. The RRC function unit 190, upon determining that the call origination is possible, at Step S5008, transmits the RRC Connection Request to the mobile communication network 200. As a result, an RRC connection is set, and at Step S5009, sending of the SMS from the APL function unit 110 to the mobile communication network 200 is executed. On the other hand, the RRC function unit 190, based on the communication success rate (or the Tbarring) based on the ACB, upon determining that the call origination is not possible, performs the control based on the ACB (or the Tbarring), and does not transmit the RRC Connection Request.

In the exemplary process procedure shown in FIG. 14, if it has been notified (skip for SMS) from the mobile communication network 200 to the RRC function unit 190 to exclude the SMS (predetermined service) from the control by the ACB, the RRC function unit 190 transmits the RRC Connection Request to the mobile communication network 200; however, if it has been determined beforehand by the operator and the like of the mobile communication network 200 to exclude the SMS from the control by the ACB, such a notice (skip for SMS) is not necessary.

FIG. 16 is a sequence diagram that shows other operations performed by the mobile communication system according to the present embodiment. Specifically, FIG. 16 is a sequence diagram pertaining to a case in which, as a predetermined service, a call origination request originating from a message board for use in disaster is excluded from the control by the ACB to permit such a call origination request.

As shown in FIG. 16, the mobile communication network 200, at Step S6001, invokes the ACB (access control) and, by using the notification information, notifies the UE 100 that Special Service (message board for use in disaster) is to be excluded from the control by the ACB (skip for Special Service).

The operations performed at Steps S6002 to S6005 are almost the same as those performed at Steps S4002 to S4005 shown in FIG. 14. However, at Step S6005, the NAS function unit 170 transmits to the RRC function unit 190 the Service Request including "Special Service originating" indicating that the call origination request has originated from the message board for use in disaster (call originating service value).

Moreover, the operations performed at Steps S6006 and S6007 are almost similar to those performed at Steps S4006 and S4007 shown in FIG. 14. A process procedure for establishing a session used in a communication with the message board for use in disaster is performed in parallel.

As a result, an RRC connection is set, and at Step S6008, transmission and registration of information and a message (voice) to the message board for use in disaster is executed from the APL function unit 110 to the mobile communication network 200.

In the above operation example, the SMS was taken as an example; however, as the predetermined service that is to be excluded from the access control, RCS (Rich Communication Services) providing presence information and the like, or the IMS PS voice call and the IMS PS video call explained in the first to third embodiments, can be considered.

(2) Actions and Advantageous Effects

According to the present embodiment, depending on the congestion conditions and the priority of the service of the mobile communication network 200, the service that is to be controlled can be controlled appropriately and surely. Particularly, when there is a need to provide the minimum service when congestion occurs at the time of a disaster, such as an earthquake, in the devices (the eNB 210, the MME, the IMS, and the like) that constitute the mobile communication network 200, other data packets (Web browsing, video hosting service, and the like) can be controlled, and communication can be performed by giving priority to a packet of a particular service (SMS, voice or message board for use in disaster, and the like).

Fifth Embodiment

Figure 17:
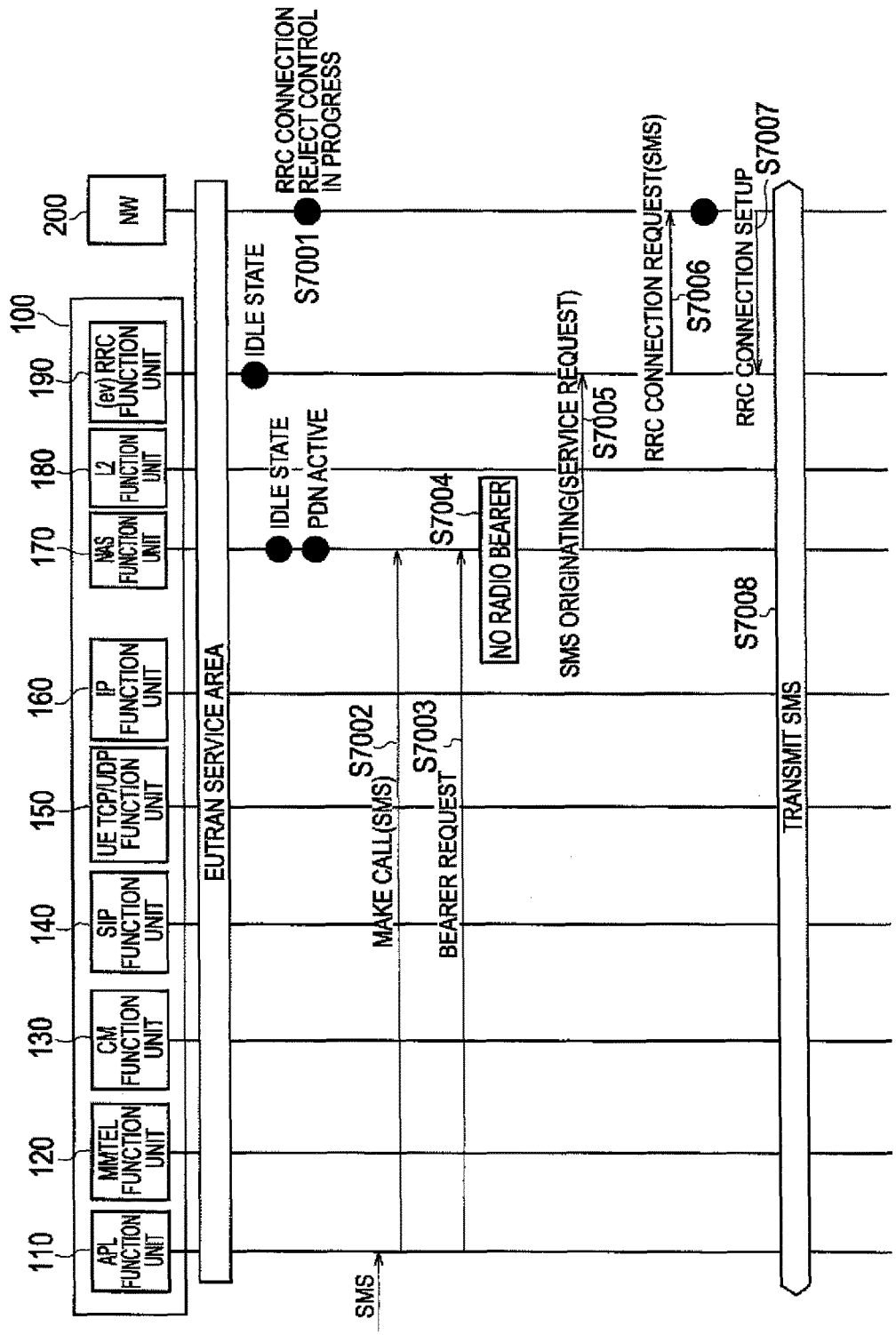
FIG. 17 is a sequence diagram that shows operations performed by a mobile communication system according to a fifth embodiment.
Figure 18:
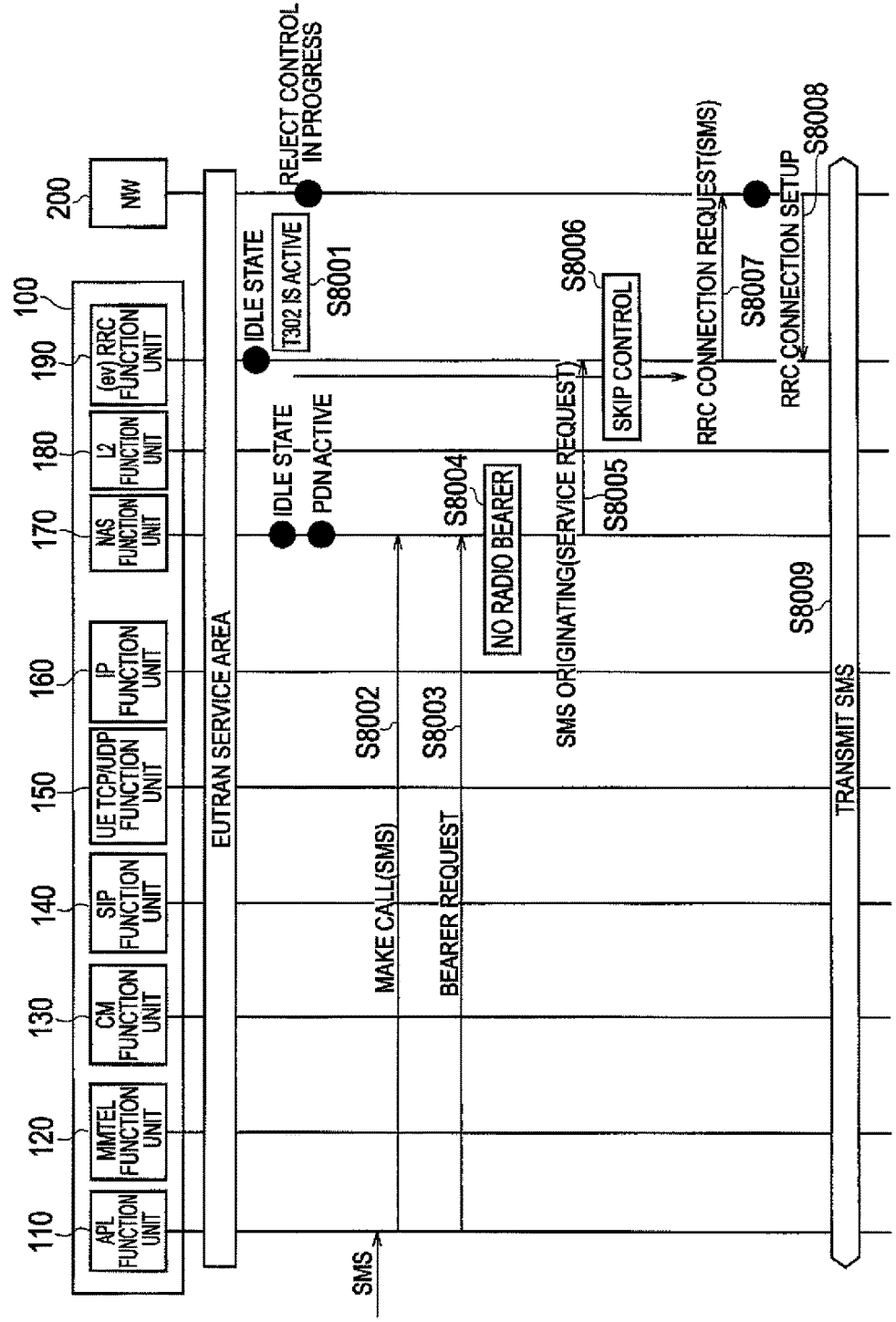
FIG. 18 is a sequence diagram that shows operations performed by the mobile communication system when T302 (wait timer) based on waitTime (wait value) is active in the fifth embodiment.

Referring now to FIGS. 17 and 18, a mobile communication system according to a fifth embodiment of the present invention is explained below focusing on the differences between the mobile communication systems according to the first and fifth embodiments.

(1) Operations of Mobile Communication System

FIG. 17 is a sequence diagram that shows operations performed by the mobile communication system according to the present embodiment. In the mobile communication system according to the present embodiment, when the RRC Connection Reject control has been invoked, a predetermined service, specifically, a call origination request originating from the short message service (SMS), is only excluded from the RRC Connection Reject control to permit the call origination request.

As shown in FIG. 16, the UE 100 is in "IDLE state" and "PDN Active state". The mobile communication network 200 invokes the RRC Connection Reject control at Step S7001.

The operations performed at Steps S7002 to S7005 are almost the same as those performed at Steps S4002 to S4005 shown in FIG. 14.

The RRC function unit 190, when the SMS originating is included in the Service Request received from the NAS function unit 170, at Step S7006, even if the RRC Connection Reject control is in progress, transmits to the mobile communication network 200 the RRC Connection Request indicating that it is an SMS call. The UE 100 recognizes that the RRC Connection Reject control has been invoked when it receives the RRC Connection Reject.

The mobile communication network 200, specifically the eNB 210, at Step S7007, performs the setting of the RRC connection based on the RRC Connection Request received from the UE 100. That is, when the SMS originating (call originating service value) indicating that the call origination request originated from the SMS (predetermined service) is included in the RRC Connection Request, even if the RRC Connection Reject control, in which a call originating from the UE 100 is controlled by rejecting the RRC Connection Request, is in progress, the eNB 210 accepts the RRC Connection Request, thereby executing the setting of the RRC connection. More specifically, even if the RRC Connection Reject control is in progress, upon receiving the RRC Connection Request indicating that it is the SMS call, the evRRC function unit of the eNB 210 transmits to the UE 100 the RRC Connection Setup without transmitting the RRC Connection Reject.

As a result, at Step S7008, an RRC connection is set, and sending of the SMS from the APL function unit 110 to the mobile communication network 200 is executed.

FIG. 18 is a sequence diagram that shows operations performed by a mobile communication system when the T302 (wait timer) based on waitTime (wait value) is active in the fifth embodiment.

As shown in FIG. 18, at Step S8001, the RRC function unit 190 activates the T302 based on the RRC Connection Reject (not shown) received from the mobile communication network 200.

The operations performed at Steps S8002 to S8005 are the same as those performed at Steps S7002 to S7005 shown in FIG. 17.

The RRC function unit 190, when the SMS originating is included in the Service Request received from the NAS function unit 170, at Step S8006, even if the T302 (wait timer) is active, skips the RRC Connection Reject control. Furthermore, at Step S8007, the RRC function unit 190 transmits the RRC Connection Request (SMS) to the mobile communication network 200.

At Step S8008, the eNB 210 performs the setting of the RRC connection based on the RRC Connection Request (SMS) received from the UE 100. That is, the eNB 210, when the SMS originating is included in the RRC Connection Request, even if the RRC Connection Reject control is in progress, accepts the RRC Connection Request, thereby executing setting of the RRC connection.

As a result, at Step S8009, an RRC connection is set, and sending of the SMS from the APL function unit 110 to the mobile communication network 200 is executed.

(2) Actions and Advantageous Effects

According to the present embodiment, similarly to the fourth embodiment, depending on the congestion conditions and the priority of the service of the mobile communication network 200, the service that is to be controlled can be controlled appropriately and surely.

Moreover, even if the RRC Connection Reject control has been invoked, and even if the RRC Connection Request in the establishment cause of which a particular service (or, a function) has been set is received from the UE 100, it is possible to make arrangement so that the RRC Connection Reject control is not performed so that flexibility of operation by the operator is improved.

Other Embodiments

The present invention has been explained above in detail by way of the first to fifth embodiments. However, no part of the above disclosure or drawings shall be understood as limiting the scope of the present invention. Various alternative embodiments of the present invention will become clear to those skilled in the art after reading this disclosure.

For example, in the above-mentioned embodiments, the EUTRAN (LTE) system was taken as an example; however, a radio access network system to which the present invention can be applied is not necessarily limited to EUTRAN. That is, the present invention is applicable to any radio access network system in which the access control, which is applied in the above embodiments, is applied.

Moreover, in the above-mentioned embodiments, the eNB 210 or the SMSC (SMSCenter) is mentioned as a network device that notifies the UE 100 of an access control to be exerted on the mobile communication network 200; however, the network device can be different depending on the control to be performed. For example, the eNB 210 can function as the network device when the control to be performed is the ACB for Data, and a device constituting the IMS, or the MME, can function as the network device when the control to be performed is the SSAC.

The above-explained invention can be represented as below. According to one aspect of the present invention, a mobile station UE 100 includes an MMTEL function unit 120 (MMTEL function unit), an NAS function unit 170 (NAS function unit), and an RRC function unit 190 (RRC function unit). The RRC function unit receives from a mobile communication network SIB2 (notification information) including ac-BarringForMO-Data (access control information for data call) to control call origination of a data call other than an urgent call and ssac-BarringForMMTEL-Voice (access control information for VoLTE call) to control call origination of an IMS PS voice call (VoLTE call), the MMTEL function unit upon detecting a call origination request for the VoLTE call, determines, based on the access control information for VoLTE call acquired from the RRC function unit, possibility of call origination of the VoLTE call, and upon determining that the call origination of the VoLTE call is possible, transmits to the NAS function unit Bearer Request (bearer request) to request establishment of a bearer for the VoLTE call, the NAS function unit, in accordance with the bearer request, transmits to the RRC function unit Service Request (service request) to notify that the call origination is from the MMTEL function unit, and the RRC function unit, in accordance with the service request, based on one of the access control information for data call and Tbarring (control timer), transmits RRC Connection Request (RRC connection request) to the mobile communication network without determining the possibility of the call origination of the VoLTE call.

In the first aspect, the RRC function unit, when a predetermined bit is included in the notification information, in accordance with the service request, based on one of the access control information for data call and the control timer, transmits the RRC connection request to the mobile communication network without determining the possibility of the call origination of the VoLTE call, and when the predetermined bit is not included in the notification information, in accordance with the service request, based on one of the access control information for data call and the control timer, determines the possibility of the call origination of the VoLTE call.

According to a second aspect of the present invention, a mobile station includes an MMTEL function unit, an NAS function unit, and an RRC function unit. The RRC function unit receives from a mobile communication network notification information including access control information for VoLTE call to control call origination of a VoLTE call, the MMTEL function unit upon detecting a call origination request for the VoLTE call, determines, based on the access control information for VoLTE call acquired from the RRC function unit, possibility of call origination of the VoLTE call, and upon determining that the call origination of the VoLTE call is possible, transmits to the NAS function unit a bearer request to request establishment of a bearer for the VoLTE call, the NAS function unit, in accordance with the bearer request, transmits to the RRC function unit a service request to notify that the call origination is from the MMTEL function unit, and the RRC function unit, in accordance with the service request, based on T302 (wait timer), transmits to the mobile communication network an RRC connection request to notify that the call origination is from the MMTEL function unit without determining the possibility of the call origination of the VoLTE call.

According to a third aspect of the present invention, a mobile communication system includes a mobile station including an MMTEL function unit, an NAS function unit, and an RRC function unit, and a mobile communication network. The RRC function unit receives from the mobile communication network notification information including access control information for VoLTE call to control call origination of a VoLTE call, the MMTEL function unit upon detecting a call origination request for the VoLTE call, determines, based on the access control information for VoLTE call acquired from the RRC function unit, possibility of call origination of the VoLTE call, and upon determining that the call origination of the VoLTE call is possible, transmits to the NAS function unit a bearer request to request establishment of a bearer for the VoLTE call, the NAS function unit, in accordance with the bearer request, transmits to the RRC function unit a service request to notify that the call origination is from the MMTEL function unit, the RRC function unit, in accordance with the service request, based on a control timer, transmits to the mobile communication network an RRC connection request to notify that the call origination is from the MMTEL function unit without determining the possibility of the call origination of the VoLTE call, and the mobile communication network, even if a radio access from the mobile station is controlled, upon receiving the RRC connection request, transmits RRC Connection Setup (RRC connection setting) to the mobile station without transmitting an RRC connection reject.

According to a fourth aspect of the present invention, a mobile station includes an application function unit, an NAS function unit, and an RRC function unit. The application function unit transmits a call origination request for a predetermined service (e.g., SMS) to the NAS function unit, the NAS function unit transmits to the RRC function unit a service request including a call origination service value (e.g., SMS originating) indicating that the call origination request originated from the predetermined service, and the RRC function unit, when the call origination service value is included in the service request received from the NAS function unit, even if an access control has been invoked by a mobile communication network, transmits an RRC connection request to the mobile communication network.

In the mobile station according to the fourth aspect, the RRC function unit, even if Tbarring (control timer) that specifies a time to control the call origination based on the access control is active, can transmit the RRC connection request to the mobile communication network.

In the mobile station according to the fourth aspect, the RRC function unit, when it has been notified from the mobile communication network that the predetermined service is to be excluded from performing the access control, can transmit the RRC connection request to the mobile communication network.

According to a fifth aspect of the present invention, a network device (e.g., eNB 210 or SMSC) is included in a mobile communication network and that notifies a mobile station of an access control to the mobile communication network, wherein the network device, when the access control has been invoked, notifies the mobile station that a predetermined service is to be excluded from the access control.

According to a sixth aspect of the present invention, a mobile station includes an application function unit, an NAS function unit, and an RRC function unit. The application function unit transmits a call origination request for a predetermined service to the NAS function unit, the NAS function unit transmits to the RRC function unit a service request including a call origination service value indicating that the call origination request originated from the predetermined service, the RRC function unit, when the call origination service value is included in the service request received from the NAS function unit, even if T302 (wait timer) based on waitTime (wait value) notified of by an RRC connection reject from a mobile communication network is active, transmits an RRC connection request to the mobile communication network.

In the mobile station according to the sixth aspect, the RRC function unit can transmit the RRC connection request that includes the call origination service value to the mobile communication network.

According to a seventh aspect of the present invention, a radio base station that executes an RRC connection setting based on an RRC connection request received from a mobile station, when a call origination service value indicating that a call origination request originated from a predetermined service is included in the RRC connection request, even if RRC Connection Reject control (RRC connection reject control) is in progress in which the RRC connection request is rejected to control call origination from the mobile station, accepts the RRC connection request and executes the RRC connection setting.

It is needless to mention that the present invention includes embodiments and the like that are not disclosed above. Therefore, the technical scope of the present invention shall be determined based on the matter(s) specifying the invention that corresponds to the appropriate scope of the claims in view of the above disclosure.

The entire contents of Japanese Patent Applications 2013-200655 (filed on Sep. 26, 2013) and 2014-107465 (filed on May 23, 2014) are incorporated in the description of the present application by reference.

INDUSTRIAL APPLICABILITY

According to one aspect of the present invention, a mobile station, a mobile communication system, and a network device that can realize more appropriate call origination control per service as intended by the operator are provided.

EXPLANATION OF REFERENCE NUMERALS

100 UE
110 APL function unit
120 MMTEL function unit
130 CM function unit
140 SIP function unit
150 UE TCP/UDP function unit
160 IP function unit
170 NAS function unit
180 L2 function unit
190 RRC function unit
200 Mobile communication network
210 eNB

The invention claimed is:

1. A mobile station comprising an application function unit, a Non Access Stratum (NAS) function unit, and a Radio Resource Control (RRC) function unit, wherein
    the application function unit transmits a call origination request for a short message service (SMS) to the NAS function unit,
    the NAS function unit transmits to the RRC function unit a service request including a call origination service value indicating that the call origination request originated from the SMS, and
    the RRC function unit, when the call origination service value is included in the service request received from the NAS function unit, even if an access control has been invoked by a mobile communication network, transmits an RRC connection request to the mobile communication network.

2. The mobile station as claimed in claim 1, wherein the RRC function unit, even if a control timer that specifies a time to control the call origination based on the access control is active, transmits the RRC connection request to the mobile communication network.

3. The mobile station as claimed in claim 1, wherein the RRC function unit, when it has been notified from the mobile communication network that the SMS is to be excluded from performing the access control, transmits the RRC connection request to the mobile communication network.

4. A mobile station comprising an application function unit, a Non Access Stratum (NAS) function unit, and a Radio Resource Control (RR C) function unit, wherein
    the application function unit transmits a call origination request for a short message service (SMS) to the NAS function unit,
    the NAS function unit transmits to the RRC function unit a service request including a call origination service value indicating that the call origination request originated from the SMS,
    the RRC function unit, when the call origination service value is included in the service request received from the NAS function unit, even if a wait timer based on a wait value notified of by an RRC connection reject from a mobile communication network is active, transmits an RRC connection request to the mobile communication network.

5. The mobile station as claimed in claim 4, wherein the RRC function unit transmits the RRC connection request that includes the call origination service value to the mobile communication network.

* * * * *